(12) United States Patent
Scherzinger

(10) Patent No.: US 7,043,364 B2
(45) Date of Patent: May 9, 2006

(54) WALKING STICK NAVIGATOR FOR POSITION DETERMINATION

(75) Inventor: Bruno Scherzinger, Richmond Hills (CA)

(73) Assignee: Applanix Corporation, Inc., Richmond Hills (CA)

( * ) Notice: Subject to any disclaimer, the term of this patent is extended or adjusted under 35 U.S.C. 154(b) by 0 days.

(21) Appl. No.: 11/043,872

(22) Filed: Jan. 25, 2005

(65) Prior Publication Data

US 2005/0203701 A1 Sep. 15, 2005

Related U.S. Application Data

(63) Continuation of application No. 10/307,129, filed on Nov. 29, 2002, now Pat. No. 6,853,909.

(60) Provisional application No. 60/337,256, filed on Dec. 3, 2001.

(51) Int. Cl.
*G01C 21/00* (2006.01)

(52) U.S. Cl. .................. 701/213; 701/220; 342/357.14

(58) Field of Classification Search ................ 701/207, 701/213, 216, 220; 342/357.06, 357.14; 702/5, 160
See application file for complete search history.

(56) References Cited

U.S. PATENT DOCUMENTS

| | | | |
|---|---|---|---|
| 5,512,905 A | 4/1996 | Nichols et al. | ........ 342/357.06 |
| 5,583,776 A | 12/1996 | Levi | |
| 5,734,348 A | 3/1998 | Aoki et al. | ............ 342/357.17 |
| 5,956,660 A | 9/1999 | Neumann | |
| 5,973,618 A | 10/1999 | Ellis | ........................... 340/990 |
| 6,132,391 A | 10/2000 | Onari | |
| 6,366,855 B1 | 4/2002 | Reilly | |
| 6,401,036 B1 | 6/2002 | Geier et al. | |
| 2002/0038178 A1 | 3/2002 | Talkenberg | |
| 2002/0091482 A1 | 7/2002 | Eakle, Jr. | |
| 2002/0111717 A1 | 8/2002 | Scherzinger | |

OTHER PUBLICATIONS

Scherzinger, B.M.; "Inertial Navigator Error Models For Large Heading Uncertainty"; IEEE Position Location and Navigation Symposium, 2001; pp. 2254-2263; abs.

HeunSoo, L.; Mase, K.; Adachi, T.; Oosawa, T.; Nakano, K.; Sengoku, M.; Hidaka, H.; Shinagawa, N.; Kobayashi, T.; "Pedestrian Tracking Using GPS, Pedometer And Magnetic Compass"; Inst Electron Inf & Commun Eng.; vol. 84 B No. 12; Dec. 2001; pp. 2254-2263 abs.

(Continued)

*Primary Examiner*—Michael J. Zanelli
(74) *Attorney, Agent, or Firm*—James F. Kirk

(57) ABSTRACT

A walking stick navigator (WSN) apparatus and process comprises an aided INS (AINS) on a staff assembly similar in operation and appearance to a GPS survey instrument. However, when GPS is available, the AINS is aided by GPS data, and the surveyor manipulates the staff assembly like a standard GPS survey instrument. When GPS is not available due to signal obstruction, the surveyor manipulates the staff assembly as a walking stick. A switch means coupled to the lower end of the staff assembly provides a stationary interval signal when the surveyor plants and holds the WSN on the ground while walking. An input process is coupled to the AINS output signals and to the stationary interval signals and provides at least one aiding input signal to the AINS for each successive stationary interval, thereby allowing the AINS to control its velocity error and position drift during a GPS outage.

19 Claims, 13 Drawing Sheets

OTHER PUBLICATIONS

Brbaker, K.M.; "Soldier Systems Fusion", Proceedings of the SPIE the International Society of Optical Engineering; vol. 3394; 1998; pp. 73-78; abstract.

The Estimation and Control of Terrestrial Inertial Navigation System Errors Due to Vertical Deflections; Nash, IEEE Transact5ions on Automatic Control, vol. AC-13, No. 4, B/1968.

Quentin Ladetto; on Foot Continuous Step Calibration Using both complementary recursive prediction and adaptive Kalman filtering; Ion GPS Sep. 19-22, 2000 Salt Lake City, UT; pp. 1735-1740.

Integration interval $t_1$ to $t_2$ is processed at the next Kalman filter measurement update at $T_k$.

Integration interval $t_1$ to $T_k$ is processed at the next Kalman filter measurement update at $T_k$.

Integration interval $T_k$ to $t_2$ is processed at the next Kalman filter measurement update at $T_{k+1}$.

WALKING STICK NAVIGATOR FOR POSITION DETERMINATION

This application claims priority from U.S. provisional patent application 60/337,256 filed Dec. 3, 2001 and continuation from Non-Provisional Application Ser. No. 10/307,129 Filed Nov. 29, 2002 which issued on Feb. 8, 2005 as U.S. Pat. No. 6,853,909, for "A WALKING STICK NAVIGATOR FOR POSITION DETERMINATION" and having a common inventor and assignee.

FIELD OF THE INVENTION

The subject invention is an Aided Inertial Navigation System (AINS) configured for land survey applications and having the form and function of a standard GPS survey instrument. The invention uses an AINS as a navigational reference, which makes it possible to survey areas where GPS signals may be missing for time intervals of varying duration, or indefinitely, due to building obstruction, operation inside a building, tree foliage and or a dense tree canopy. An AINS that is normally aided with a radio positioning system such as GPS but loses position aiding as a result of signal blockage enters into a dead reckoning navigation mode, and requires some alternative form of aiding to control the position error drift. A typical source of velocity aiding is a zero velocity update in which the AINS is held stationary periodically to reset the accumulated velocity error to zero. The subject invention implements an AINS in a format that is similar to a standard GPS survey instrument, and uses a novel method of zero velocity aiding to navigate through GPS outages caused by signal blockage.

BACKGROUND OF THE INVENTION

The Trimble 4700 Site Surveyor is an example of a GPS land survey instrument that is similar to the present invention. Similar products are available from other GPS manufacturers. The 4700 Site Surveyor has a staff with a GPS antenna at the top end and a simple spike at the bottom end. A hand-held control and display unit (CDU) can be alternatively held by the surveyor or mounted to the staff at the approximate midpoint. Modern GPS receivers for surveying are small enough to be mounted to the staff as well. Alternatively the receiver can be carried with the batteries that power the unit in a backpack carried by the surveyor. The surveyor walks to each point to be surveyed, places the spike at the bottom end on the point, and either records a position computed by the receiver or "occupies" the point for a period of time during which the receiver records data for post-survey processing.

The disclosed Walking Stick Navigator (WSN) is designed to have the "look and feel" of a typical GPS survey instrument. It is believed that the WSN will gain acceptance among surveyors fairly quickly because of its similarity to industry accepted GPS survey instruments. The only additional field procedure that a surveyor must conduct is to manipulate the WSN like a walking stick when GPS drops out.

In operation, the surveyor uses the WSN for dead reckoning navigation when GPS signals become obstructed, as might occur inside or between buildings or in a forested area. The surveyor walks a survey trajectory and uses the WSN as a positioning system to survey positions along the trajectory. Such survey trajectories sometimes pass through areas where no GPS signals are available. The WSN must therefore navigate in a dead-reckoning mode with as little position drift as possible.

RELATED ART

Precise Pedometer Navigator

U.S. Pat. No. 6,594,617 B2 for a A Pedometer Navigator System issued on Jul. 15, 2003 having a common inventor and assignee. The product covered by the Pedometer Navigator System is know as a Precise Pedometer Navigator (PPN). The U.S. Pat. No. 6,594,617 B2 patent provides an alternative method to a zero-velocity update (ZUPD) for aiding an Inertial Navigation System (INS) in a Pedometer Navigation System. The embodiment of the PPN taught in U.S. Pat. No. 6,594,617 B2 uses a short-baseline position measurement subsystem (an SBPMS) to measure the relative positions of the surveyor's feet with respect to the INS to establish the displacement of the INS with respect to a stationary foot when either foot is stationary. An example of an SBPMS is a magnetic position sensor such as the Fastrak product from Polhemus Incorporated (Colchester, VT). When the surveyor is walking, one foot will be stationary while the other is moving, and both feet will be stationary during a step, provided that the surveyor walks and doesn't run or jump. This relative displacement information becomes aiding information to the AINS algorithm in the AINS land surveyor in place of the aiding information that ZUPD's provide. Art relevant to this disclosure should teach the concept of referencing the INS position to a stationary ground point that a precise pedometer navigator identifies.

The applicant has also filed an application for an AINS Land Surveyor System With Reprocessing, AINS-LSSRP which issued as U.S. Pat. No. 6,834,234 B2 on Dec. 21, 2004 having a common assignee.

SUMMARY OF THE INVENTION

The WSN apparatus and process, programs and algorithms described herein are employed in a staff assembly such as a standard survey staff with an AINS coupled to and aligned on the staff assembly. A GPS antenna is mounted at the top of the staff assembly. An inertial measurement unit (IMU) assembly is mounted to the bottom of the staff assembly. A ground spike is mounted to the bottom of the IMU assembly. A ZUPD switch is coupled to the ground spike at the lower end of the staff assembly and is arranged to transfer when the ground spike touches the ground. A plunger compresses the ZUPD switch slightly as the ground spike contacts the ground.

A surveyor manipulates the WSN as a GPS source of position information when GPS signals are unobstructed and valid data from the GPS receiver is available. This method is the same as the method used with a standard GPS survey instrument. The surveyor manipulates the WSN as a walking stick when GPS signals are obstructed and valid GPS data is not available. This procedure is referred to as "walking stick manipulation". As the surveyor moves along a path to be surveyed, the surveyor positions the lower end of the WSN shaft assembly at a stationary point. The surveyor pivots the shaft around the stationary point substantially in the direction of surveyor movement. At the end of the step or stride, the surveyor lifts the shaft assembly and repositions the lower end of the shaft assembly at a subsequent stationary point beyond the surveyor's advancing foot and in the direction of surveyor movement. At the conclusion of a stride, the sequence is repeated.

When the surveyor positions the WSN shaft assembly, the ZUPD switch closes. The closure indicates that the ground spike at the point of contact with the ground is stationary.

The WSN has a digital computer running a program solving a position aiding algorithm. The stationary interval signals provided by the ZUPD switch closure define the time intervals during which the ground spike is stationary. The program solving the position aiding algorithm uses Equations to provide at least one aiding input to the AINS for each successive stationary interval. The AINS processes the aiding data from the ZUPD switch during a stationary interval and thereby regulates the velocity error and the position error growth during the time interval that GPS data is unavailable.

DETAILED DESCRIPTION OF THE INVENTION

Figure 1:
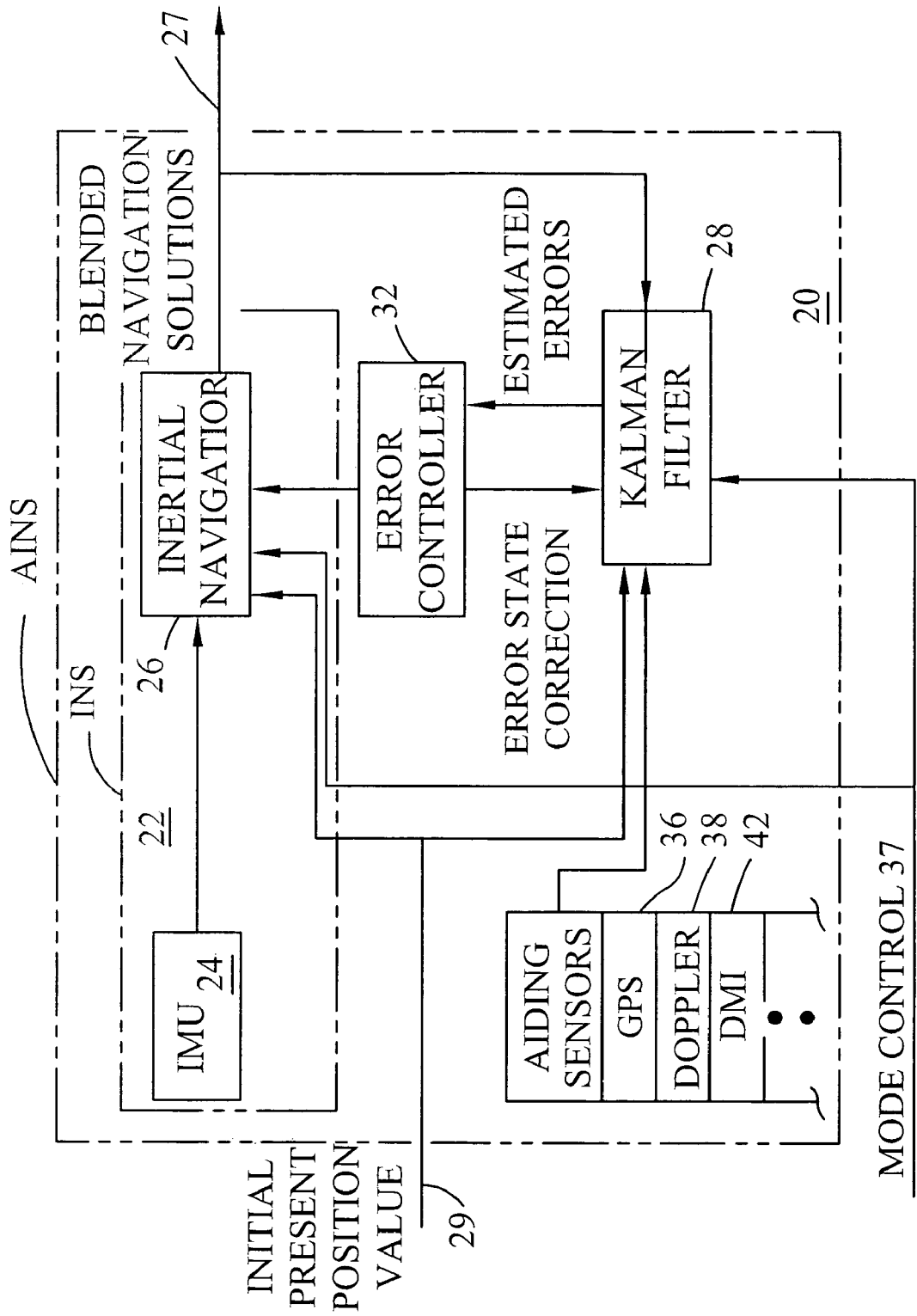
FIG. 1 is a block diagram of an aided INS system.

FIG. 1 is a block diagram that shows the architecture of a generic AINS within phantom block 20. The AINS is provided with an initial present position input from a keyboard or other input device (not shown) on mode control bus 25. The AINS comprises an INS shown within phantom block 22 as having an Inertial Measuring Unit (IMU) 24 and an inertial navigator 26. A Kalman filter 28 and an error controller 32 estimate INS errors and correct the INS 22 by using inputs to the Kalman filter from one or more aiding sensors within block 34, such as a GPS antenna and receiver 36, a Doppler Radar 38, or a distance measuring instrument (DMI) 42. The Kalman filter 28 and the error controller 32 process and provide corrections for the inertial navigator 26 which periodically outputs a sequence of corrected or blended present position solutions in real time on output bus 27.

The inertial navigator 26 is typically mechanized using a digital computer and navigational software for processing signals from the IMU 24. The IMU comprises a triad of accelerometers (not shown) that measure total acceleration, and a triad of gyros (not shown) that measure total angular rate. The IMU 24 also provides process and interface electronics (also not shown) that convert and output inertial acceleration and angular rate signals in a digital format. The inertial navigator system 22 mechanizes Newton's equations of motion using the aforementioned navigational software and digital computer (not shown).

The INS 22 initially performs a ground alignment after which it transforms signal data from its package or vehicle navigation coordinate frame into a fixed and earth-referenced coordinate system, such as a north, east and down referenced system. A typical ground alignment or gyrocompassing alignment requires the INS to be stationary for 5–15 minutes. The INS uses its accelerometers to establish the direction of the gravity vector. With the latitude of the INS present position as an input, the inertial navigator calculates the horizontal component of rotational rate that a horizontal north pointing referenced axis would experience. The alignment process then adjusts the body-to-earth direction cosine matrix (DCM) as required to match the measured roll rate of the transformed north pointing body axis to the calculated roll rate for the north pointing axis. Accelerometer and gyro axis rates are thereafter transformed into earth referenced data using the adjusted DCM. In some mechanizations, the horizontal north pointing axis is aligned to a heading other than north and east and the heading offset angle is called the wander angle.

The IMU 24 generates incremental velocities and incremental angles at the IMU sampling rate, typically 50 to 500 samples per second. The corresponding IMU sampling time interval is the inverse of the IMU sampling rate, typically 1/50 to 1/500 seconds. The incremental velocities are obtained from outputs of the IMU accelerometers that are integrated over the IMU sampling time interval. The incremental angles are the angular rates from the IMU gyros integrated over the IMU sampling time interval. The inertial navigator 26 receives the sampled inertial data from the IMU 24 and computes the current IMU present position (typically latitude, longitude, altitude), velocity (typically north, east and down components) and orientation (roll, pitch and heading) at the IMU sampling rate. Mode control bus 25 provides management and data signals to the AINS from an external source such as a keyboard or a ground switch.

The aiding sensors in block 34 represent any sensors that provide navigation information that is statistically independent of the inertial navigation solution that the INS generates. Examples of aiding sensors include one or more Global Navigation Satellite System (GNSS) receivers, an odometer or Distance Measuring Indicator or instrument (DMI), and a Doppler radar providing velocity data. The U.S. Global Positioning System (GPS) and Russian GLONASS are the currently available GNSS systems, and GPS is the most widely used for navigation and survey applications. The European Galileo system is scheduled to become an available GNSS within the next 10 years. The embodiment of the invention described in the subsequent text uses one or two GPS receivers. Future embodiments may use other GNSS receivers that may become available.

The Kalman filter 28 is a recursive minimum-variance estimation algorithm that computes an estimate of a state vector based on constructed measurements. The measurements typically comprise computed differences between the inertial navigation solution elements and corresponding data elements from the aiding sensors. For example, the computed inertial-GPS position difference measurement comprises the differences between the respective latitudes and longitudes computed by the inertial navigator 26 and the latitudes and longitudes measured and reported by a GPS receiver. The true positions cancel in the differences, so that the differences in the position errors remain. A Kalman filter designed for use with an INS and aiding sensors will typically estimate the errors in the INS and aiding sensors. The INS errors typically comprise the following: INS position errors, INS velocity errors, INS platform misalignment errors, accelerometer biases and gyro biases. Aiding sensor errors can include the following: GPS north, east and down position errors, GPS carrier phase ambiguities and a DMI scale factor error.

The error controller 32 computes a vector of resets from the INS error estimates generated by the Kalman filter 28 and applies these to the inertial navigator integration processes, thereby regulating the inertial navigator errors in a closed error control loop. The inertial navigator errors are thereby continuously regulated and hence maintained at significantly smaller magnitudes.

The state-of-the-art in aided inertial navigation is mature. The technology originated in the late 1960's. An excellent example of a textbook on the subject is "Aerospace Avionics Systems, A Modern Synthesis", by George Siouris published by Academic Press in 1993.

AINS Land Surveyor

An AINS land surveyor is any embodiment of an AINS carried by a surveyor for the purpose of measuring position fixes. The AINS land surveyor does not require access to the sky, as does a GPS receiver, and hence can be operated under a dense tree canopy, underground or inside buildings, scenarios where a GPS receiver cannot function. An example of a high performance AINS land surveyor is the Applanix POS LS. This is a backpack-borne instrument design for conducting seismic surveys. It allows a single surveyor to walk and establish surveyed positions among the trees in a forest without requiring trees to be cut to establish a survey lane, as does a survey conducted with a GPS survey instrument, a laser theodolite or a total station. The cost savings can be large, as the operation does not need to pay for "slasher" crews that cut the trees or the stumpage fees for trees that are cut down and not always harvested. The environmental impact is also low to non-existent.

A current embodiment of an AINS-based land surveyor such as the POS LS require the surveyor to bring the AINS to a complete rest periodically, typically every 1–2 minutes, for a period of 15–30 seconds. This is called a zero-velocity update (ZUPD). The Kalman integration filter uses these zero velocity observations to zero the INS velocity error and partially calibrate inertial sensor errors. The position error drift with periodic ZUPD's is on the order of 1–2 meters per kilometer. The requirement for ZUPD's is often an inconvenience, since it limits the surveyor's production. Possible methods by which a current AINS land surveyor determines a stationary condition include the following. The AINS detects and processes the ZUPD automatically using the INS velocity. In the alternative, the surveyor identifies a ZUPD by way of a signal to the INS from a switch.

Automatic ZUPD detection can be unreliable because it must include tolerance for an INS velocity drift between ZUPD's, typically on the order of a few centimeters per second. This admits false ZUPD detection when the surveyor has come to a stop for some reason other than an intentional ZUPD. Having the surveyor identify a zero velocity condition admits surveyor error. In either case, an incorrectly identified ZUPD processed by the AINS Kalman filter can cause the AINS Kalman filter to develop inaccurate INS error estimates and lead to a performance failure in the AINS land surveyor.

Notation

The following notation is used in the description that follows: $\vec{x}$ denotes a vector with no specific reference frame of resolution. $\vec{x}^a$ denotes a vector resolved in a coordinate frame called the a-frame. All coordinate frames are right-handed orthogonal frames. This implies that the X-Y-Z axes form an orthogonal triad in the forward, right and down directions. Typical coordinate frames of interest are the geographic frame (g-frame) whose principal axes coincide with the north, east and down directions, and the inertial sensor body frame (b-frame), whose principal axes coincide with the input axes of the inertial sensors.

Subscripts on vectors are used to indicate a particular property or identification of the vector. For example, $\vec{1}_{S\text{-}G}^a$ denotes the lever arm vector resolved in the a-frame from the inertial sensor frame origin S to a GPS antenna phase center G.

Matrices are designated with capital letters $C_a^b$ denotes a direction cosine matrix (DCM) that transforms a vector from the a-frame to the b-frame, i.e., $\vec{x}^b = C_a^b \vec{x}^a$.

Time dependency of a quantity is indicated with round brackets around a time variable or index. For example, $C_a^b(t_1)$ denotes the value of the DCM at time t1.

An increment of a variable is indicated with the symbol $\Delta$. For example, $\Delta \vec{x}$ denotes the increment of the vector $\vec{x}$ over a predefined time interval. An error in a variable is indicated with the symbol $\delta$. For example, $\delta \vec{x}$ denotes the error in the vector $\vec{x}$. $\delta \Delta \vec{x}$ denotes the error in the increment of $\vec{x}$ over a predefined time interval.

The WSN is designed to have a "look and feel" similar to that of a typical GPS survey instrument. The surveyor manipulates the WSN as he would manipulate a GPS survey instrument when adequate GPS signal reception is available. This involves carrying the instrument from one point to be surveyed to another, usually so that the instrument is vertical and the GPS antenna has access to the sky. When GPS signal strength is unacceptable for surveying, the surveyor then manipulates the WSN like a walking stick.

Figure 2:
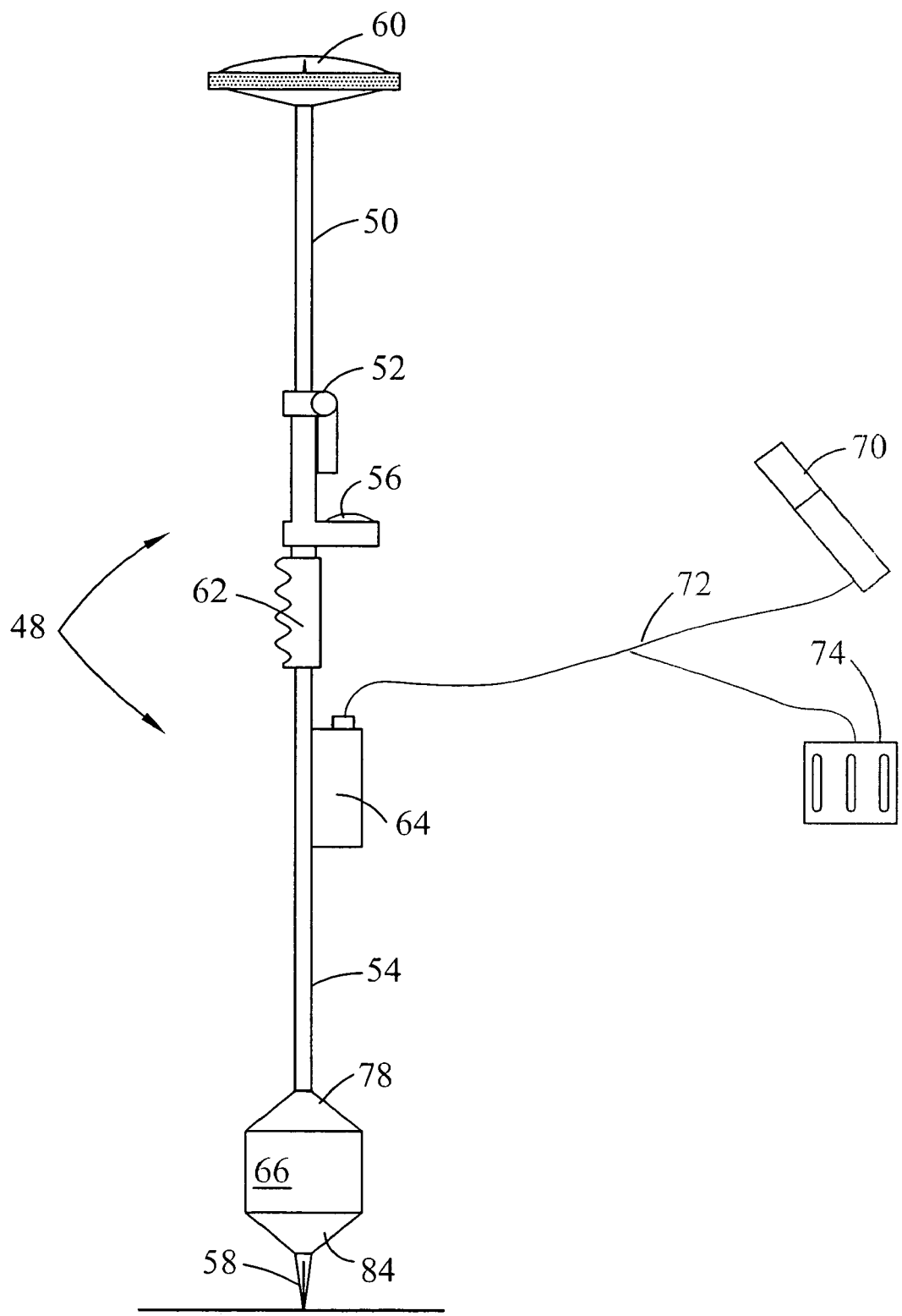
FIG. 2 is a schematic side view of a WSN configuration using a single GPS.

FIG. 2 shows the basic WSN configuration. The WSN computes the surveyor's position on the earth from an AINS aided by GPS when the GPS signal strength is adequate and by ZUPD's during GPS outages. A survey staff assembly 48 comprises an upper staff 50, an upper staff lock 52, a bubble level 56, a lower staff 54, and ground spike 58. FIG. 2 also depicts GPS antenna 60, handgrip 62, navigation computer system 64, IMU enclosure 66, control and display unit 70, data and power wire harness 72 and a power module 74. The survey staff assembly 48 is a standard item that can be obtained from a supplier of survey equipment.

Figure 3:
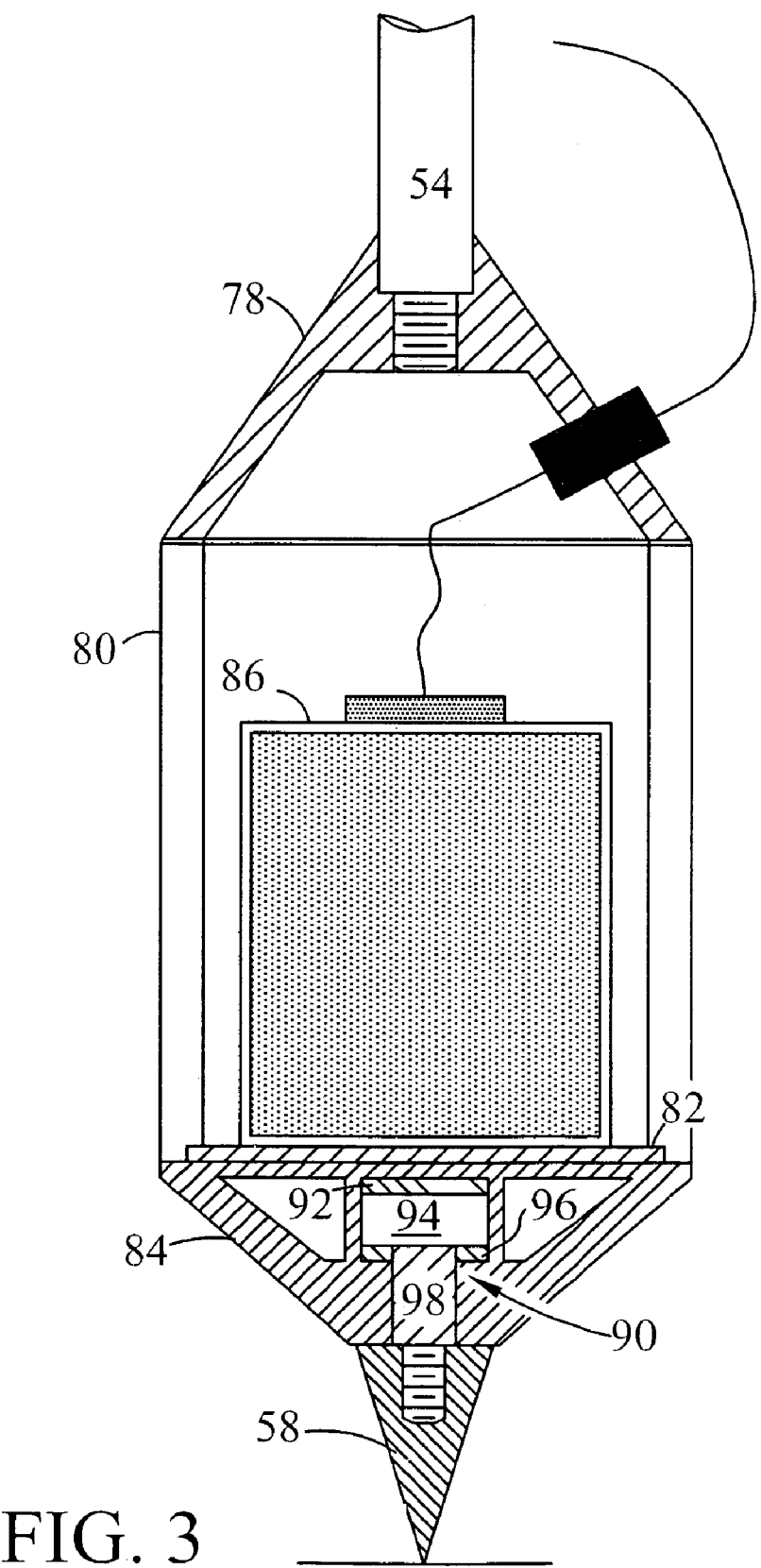
FIG. 3 is a schematic sectional view of the IMU enclosure.

The upper staff 50 telescopes into the lower staff 54 and is locked into position with the upper staff lock 52 for storage. The top of the upper staff 50 typically has a ⅝-inch coarse threaded stud to which a GPS antenna or retro-reflector can be attached. The bottom of the lower staff 54 also has a ⅝-inch coarse threaded stud which is attached to top cap 78. Top cap 78 is attached to IMU enclosure 66 as shown in FIG. 3. IMU enclosure 66 is attached to bottom cap 84, and ground spike 58 is attached to bottom cap 84. The surveyor uses the bubble level 56 to move the survey staff to a vertical orientation.

The GPS antenna is mounted on the top end of the survey staff 48. When the staff is held in its normal vertical position, the antenna faces the sky. The IMU enclosure 66 is mounted on the bottom end of the shaft, so that the IMU is close to the ground when the staff is held in its normal vertical position.

The navigation computer system (NCS) 64 contains a GPS receiver and computer subsystem. The GPS receiver receives the radio frequency (RF) signal from the GPS antenna 60 and computes either observables for each tracked satellite (pseudorange, carrier phase, ephemeris parameters) or a GPS navigation solution (position in geodetic coordinates). The computer subsystem performs all navigation data processing. The control and display unit (CDU) 70 displays information from the WSN for the surveyor to view and receives control signals from the surveyor to the WSN. The power module 74 contains batteries and power management electronics for powering the WSN. The data and power wire harness 72 provides the electrical interface between the CDU 70, power module 74 and NCS 64. In the preferred embodiment, the surveyor carries the CDU 70 and power module 74 in a backpack or on a specially designed belt. In alternative embodiments, these components can be mounted on the survey staff.

FIG. 3 shows a preferred embodiment of the IMU enclosure 66 mounted to the bottom end of the survey staff assembly 48. The following components are shown in FIG. 3: top cap 78, enclosure cylinder 80, IMU mounting plate 82, and bottom cap 84. The top cap 78 is machined so that the bottom end of the survey staff assembly 48 (the lower staff 54) screws into a ⅝-inch coarse threaded center hole. The conical shape of the top cap 78 provides a rigid interface between the survey staff and the IMU enclosure 66. The IMU 86 is mounted to the IMU mounting plate 82 positioning the IMU 86 inside of the enclosure cylinder 80. The top cap 78 is fastened to the enclosure cylinder using screws in threaded holes, by bonding, welding, or by the threaded engagement of the two parts. The IMU mounting plate 82 can be fastened to the enclosure cylinder 80 and the bottom cap 84 to the IMU mounting plate 82.

The bottom cap 84 contains the ZUPD switch assembly 90. The ZUPD switch assembly 90 has a shock isolator 92, a ZUPD switch 94, a plunger spring 96, a plunger 98 and ground spike 58.

The ground spike 58 is a standard component of the survey staff. The plunger 98 has a ⅝-inch coarse threaded stud to which the ground spike 58 is screwed. The plunger 98 is the interface between the ground spike 58 and the ZUPD switch 94. The plunger spring 96 exerts a force on the plunger 98 that pushes the plunger to its normally extended position. The plunger spring 96 can be a coil spring, leaf spring or compressible material such as rubber. As the surveyor plants the ground spike of the WSN into the earth, the ground spike 58 supports the weight of the WSN. The upward force applied by the ground spike compresses the plunger spring and drives the plunger 98 into a compressed state. The plunger spring 96 is an optional component that is not required if the ZUPD switch 94 provides its own return or restoring force.

The ZUPD switch 94 can be any switch that changes state from an OPEN/OFF state to a CLOSED/ON with a specified activation force. Preferably, the ZUPD switch 94 returns to the OPEN/OFF state by itself as the force is removed. A push-button switch is an example of such a switch. The preferred embodiment will use a solid-state switch such as a piezo-electric switch with no mechanically moving parts. Such a switch will include an electronic circuit that converts the raw sensor signal to an ON or OFF signal that is compatible with TTL or CMOS logic circuitry. When the surveyor holds the WSN so that the ground spike 58 is not in contact with the ground, the ZUPD switch 94 assumes an OPEN or OFF state by the mechanical design of the ZUPD switch 94 and/or possibly supplemented by the plunger spring 96. When the surveyor plants the WSN, the weight of the WSN plus any downward force that the surveyor might exert is brought to bear on the tip of the ground spike 58 and onto the ZUPD switch 94 via the plunger 98, causing the ZUPD switch to close and issue an ON signal. A piezo-electric or similar switch that closes with the application of pressure will undergo almost zero displacement, hence the length dimension of the WSN will appear to the surveyor to be unchanged whether the WSN is planted or not.

The shock isolator 92 isolates the IMU 86 from shock that occurs when the surveyor plants the WSN onto a hard surface, such as concrete. The shock isolator 92 also prevents saturation of the inertial sensors in the IMU. Hard placement of the WSN on an unyielding surface can result in transient accelerations or shocks on the order of 100 gravities over a few milliseconds, which could be enough to saturate the IMU accelerometers or possibly disturb their calibration or cause them physical damage.

Figure 4:
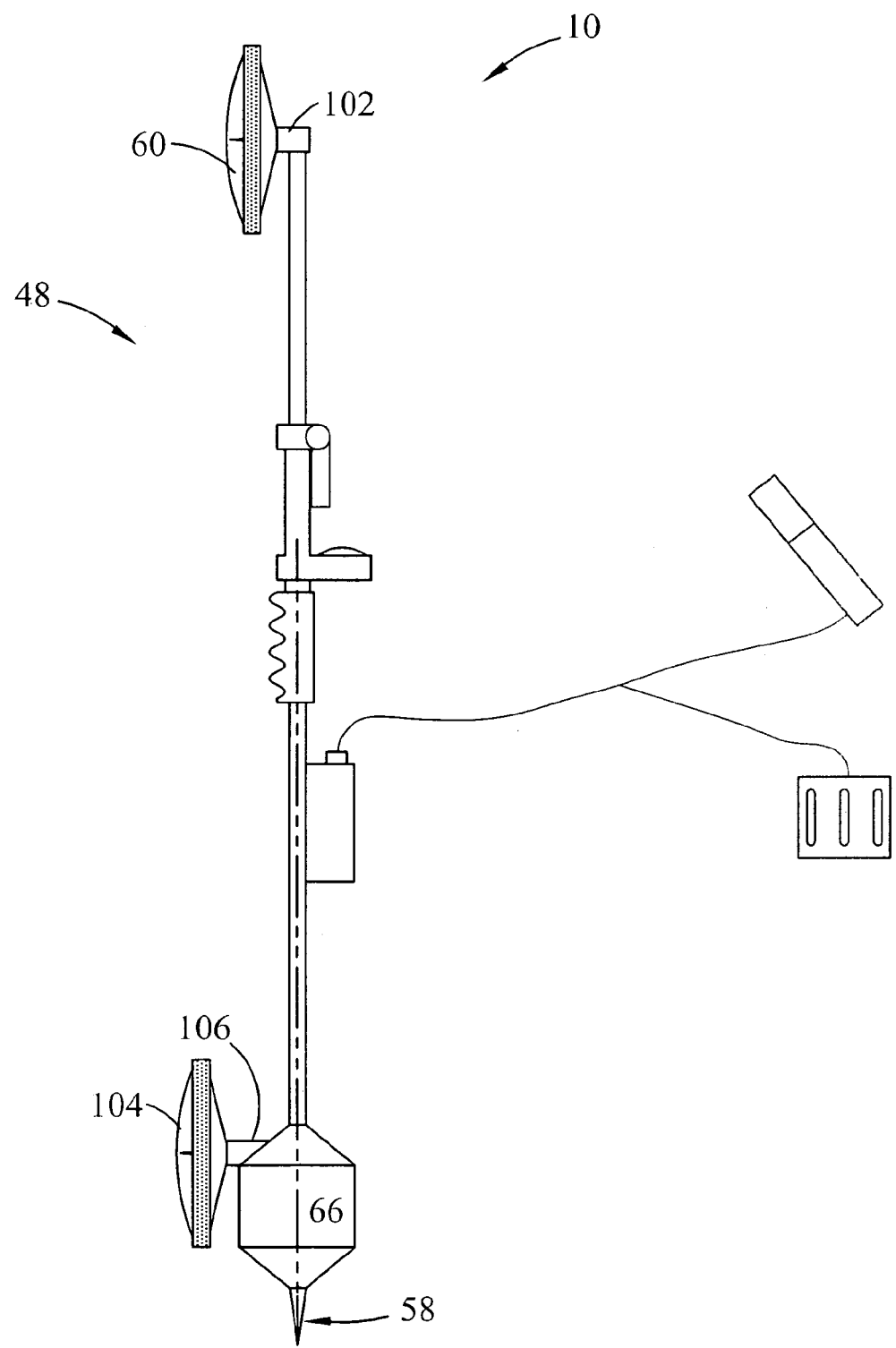
FIG. 4 is a schematic side view of a WSN; alternative configuration using two GPS receivers.

FIG. 4 shows an alternative configuration that includes a second-GPS heading sensor 104. The dual-GPS heading sensor is called a GPS azimuth measurement subsystem (GAMS) 100. The primary GPS antenna 60 is mounted so that its antenna plane is parallel to the survey staff assembly 48 via an antenna bracket 102. A second GPS antenna 104 is mounted to a mounting bracket 105 that is an additional component of the IMU enclosure 66. The antennas 60, 104 are aligned to be coplanar.

Figure 5:
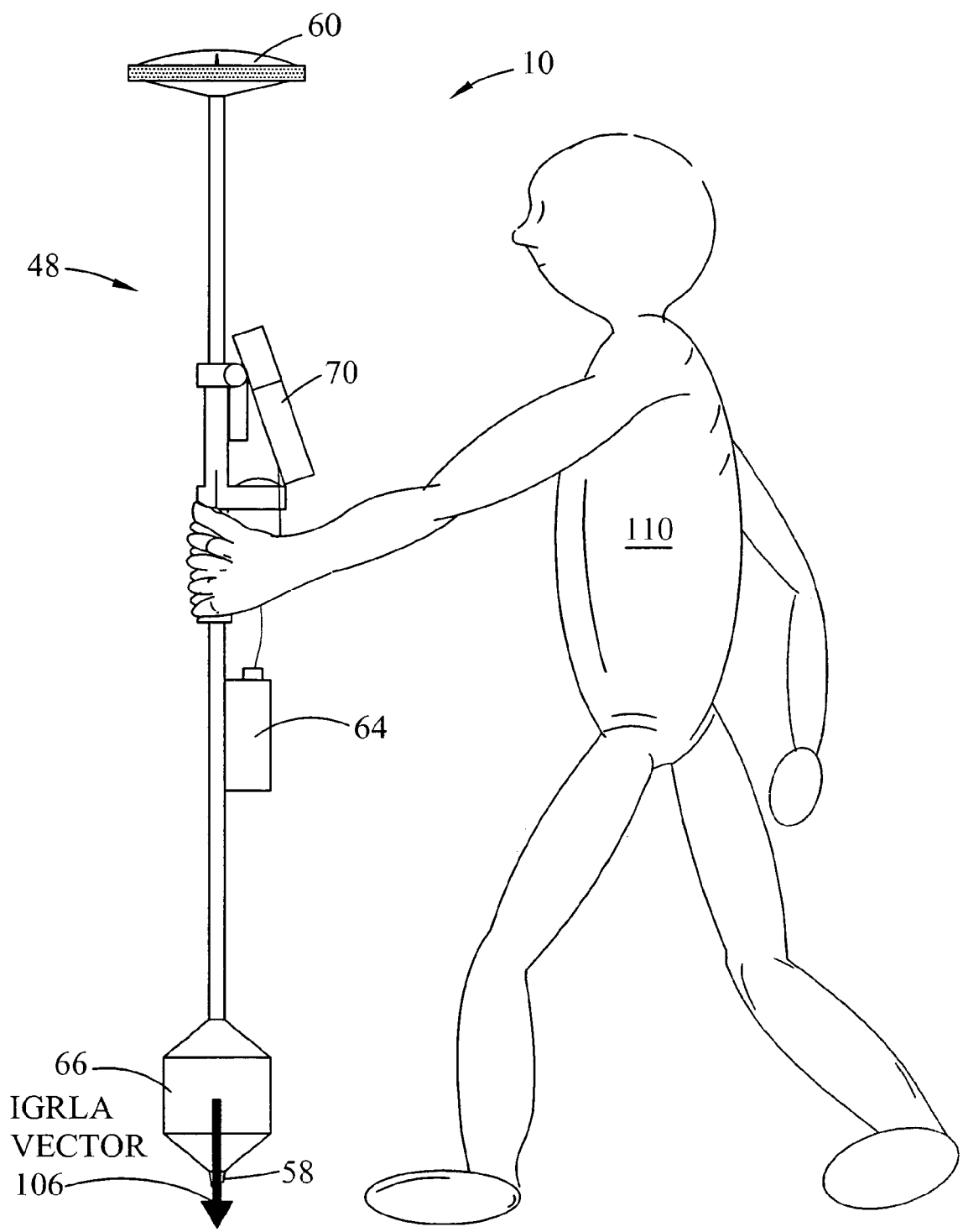
FIG. 5 is a schematic side view of the WSN held in its normal vertical position.

FIG. 5 shows the WSN held by the surveyor in its normal vertical position. A position vector called the IMU to Ground Reference lever arm (IGRLA) vector 106 extends from an origin within the IMU enclosure 66 to the ground. The IMU enclosure is rigidly attached to the staff 48. The IGRLA vector describes the relative position of the IMU with respect to the tip of the ground spike in IMU or b-frame coordinates. The IMU or b-frame is fixed to the staff 48, therefore the IGRLA vector is fixed, measurable and hence known to the WSN processing software.

When GPS data are available, the surveyor simply carries the WSN as he would a GPS survey instrument. The WSN runs a GPS-aided INS algorithm as shown in FIG. 1 to compute a blended navigation solution and improve on the INS alignment. This is classical AINS operation as described in numerous references such as in Aerospace Avionics Systems, A Modern Synthesis, George Siouris, Academic Press 1993.

When GPS drops out due to signal shading, as will be the case in forests, among and inside buildings, the surveyor manipulates the WSN like a walking stick. The WSN runs an AINS algorithm to control the position error drift during dead-reckoning navigation that uses relative displacements of the IMU 86 within enclosure cylinder 80 that the WSN measures from knowledge of the IGRLA vector 106 and the zero velocity of the ground spike 58 when the ZUPD switch 94 closes.

Figure 6:
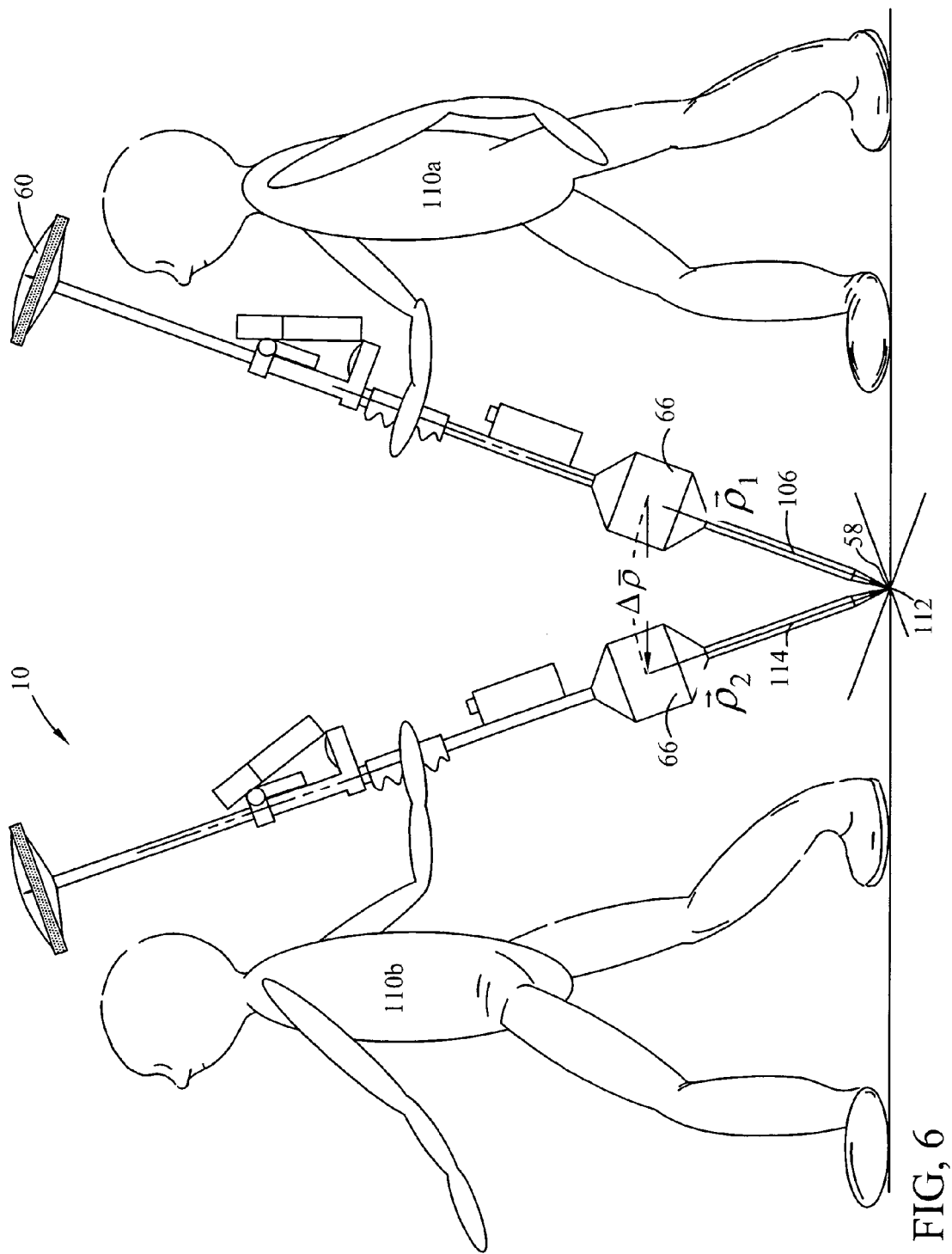
FIG. 6 is a schematic side view showing the geometry of a step during walking stick manipulation.

FIG. 6 shows the geometry of a step as the surveyor moves forward and handles the WSN 10 during a typical series of steps. The surveyor 110a plants the ground spike 58 in front of him and then steps past it before repeating the operation. The ground or ZUPD switch 94 closes when the ground spike 58 enters the ground signalling that the a ground spike 58 is stationary. The Ground Reference lever arm (IGRLA) vector 106 is equivalent to the vector depicted as $\vec{\rho}_1$ on FIG. 6. Both vectors define the relative position of the IMU, with respect to a stationary point 112 on the ground at the instant of closure of the stationary ground switch 58 in the IMU enclosure 66.

While the bottom end of the ground spike 58 is stationary, the surveyor moves forward to a second position 110b at the left. The IMU rotates on the IGRLA vector 106 about the stationary point 112 to a position defined by a second IMU to Ground Reference lever arm (IGRLA) vector 114 which is depicted on the drawing as $\vec{\rho}_2$. The IMU 86 within the IMU housing 66 thereby undergoes a translation of position to the point at which the ZUPD switch 94 opens as the surveyor raises the WSN 48. The WSN computes the change in position $\Delta\vec{\rho}$ from a knowledge of the ground reference lever arm or the IGRLA vector 106, the $\vec{\rho}_1$ and $\vec{\rho}_2$ vectors and the Euler angles from the inertial navigation solution. For the purpose of identification, the $\vec{\rho}_1$" vector will be referred to as a first relative IMU position vector and the $\vec{\rho}_2$" vector will be referred to as a second relative IMU position vector. The vector $\Delta\vec{\rho}_{1-2}$" is referred to as a time synchronized relative IMU displacement vector.

In a first method of integrating this data into the Kalman filter 28, the WSN uses the position increment $\Delta\vec{\rho}$, shown in FIG. 6, at each stationary pole fix as aiding data in the integration Kalman filter of the AINS referred to in FIG. 1. The Kalman filter 28 compares the IMU position increment with an equivalent inertial navigator position increment, and thereby estimates inertial navigator velocity errors and alignment (roll, pitch, heading) errors. The position increment during each step is handled independently of the previous or next.

In a second method, the WSN computes the relative velocity of the IMU with respect to the stationary ground reference as the vector cross product of the known IMU angular rate and the known IGRLA vector. The Kalman filter compares the relative IMU velocity with an equivalent inertial navigator velocity, and thereby estimates inertial navigator velocity errors and alignment (roll, pitch, heading) errors. The position increment during each step is handled independently of the previous or next.

The error controller 32 in FIG. 1 provides a component of the aided inertial navigator algorithm that corrects the inertial navigator velocity and alignment errors based on the Kalman filter estimates of velocity and alignment errors. The error regulation of the INS outputs with arbitrary aiding data is a process that is known to those skilled in the art. The closed-loop error regulation shown in FIG. 1 using either the incremental position or zero velocity aiding data thus regulates the inertial navigator errors when no GPS data are available. Hence the aiding data improves the dead-reckoning position accuracy of the aided INS during GPS outages or complete absence of GPS data.

Figure 7:
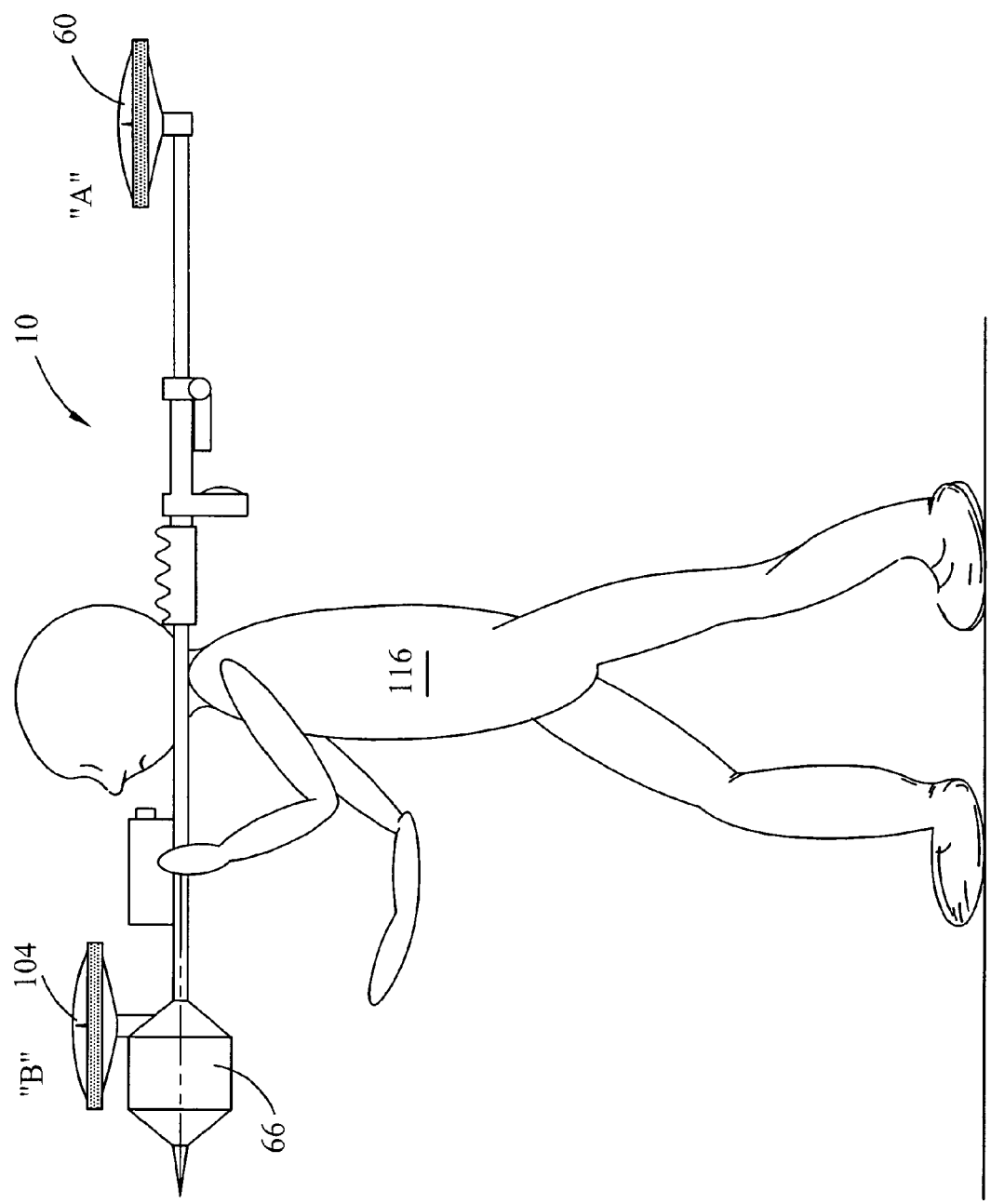
FIG. 7 is a schematic side view of a WSN with two GPS receivers.

FIG. 7 shows the surveyor carrying an alternative WSN configuration with GAMS. The WSN 10 of FIG. 4 with two GPS antennas 104, 60 referred to as a GAMS is shown being carried on the left shoulder of surveyor 116. The purpose of the GAMS is to provide a direct measurement of heading for the purpose of aiding the INS. In a GAMS system, one antenna is located at each end of the staff assembly 48. The two antennas are used to measure the heading of the WSN 10 when GPS coverage is available. This allows a lower quality IMU to be used.

Multi-antenna GPS attitude sensors are standard products in the GPS industry. The Applanix POS MV and POS LV are products that use a GAMS to achieve heading accuracies on the order of 0.02 degrees with IMU's having 3–10 degrees/ hour gyro biases.

Without a method of direct heading measurement, the achievable heading accuracy is determined by the gyro-compassed heading error lower bound given by:

$$\delta\psi \geq \frac{\varepsilon_{hor}}{\Omega_e \cos\lambda} \quad (1)$$

where $\delta_\psi$ is the AINS heading error magnitude
$\varepsilon_{hor}$ is the horizontal gyro bias of the IMU
$\Omega_e$ is the earth rotation rate, nominally 15 degrees/hour
$\lambda$ is the AINS latitude.

An AINS that uses a low cost IMU with a gyro bias on the order of several degrees per hour can at best achieve a gyro-compassed heading accuracy of several degrees, which is insufficient for extended dead reckoning. A GAMS provides an independent measurement of heading, which the WSN 10 shown in FIG. 7 uses periodically to update its heading. The heading measurement becomes a measurement input into the AINS Kalman filter 28 in FIG. 1 and is used for the purpose of heading error observation and estimation. The AINS Kalman filter calibrates the gyro biases and thereby reduces the effective gyro bias from the IMU bias to a smaller residual bias. If GPS should drop out, the heading error will grow at a rate determined by the gyro bias calibrated by the Kalman filter, which is a fraction of the IMU gyro bias. If the IMU has a gyro bias of 5 degrees per hour, then the heading error will drift at around 0.5 degree per hour, which is the equivalent of 0.5 arc-minutes per minute or 0.01 degrees per minute. The AINS thus can maintain a heading accuracy of 0.5 degrees during a GPS dropout for up to 60 minutes.

The GAMS computes heading using a standard GPS 3-axis attitude determination algorithm as described in Global Positioning System: Theory and Operation, by Bradford W. Parkinson and James J. Spilker Jr. (editors), in Volume II, American Institute of Aeronautics and Astronautics (AIAA) Volume 164 (1996) at Chapter 19 (page 519). The system is reduced to 2 antennas for heading measurement only. The following is a simplified description to convey the concept.

The GAMS computes a relative position vector $\vec{r}_{AB}$ of the bottom antenna 104, here called antenna B, with respect to the top antenna 60, here called antenna A, using a standard precise positioning algorithm referred to in the GPS community as real-time kinematic (RTK) positioning. The achievable relative positioning accuracy is on the order of 5 millimeters. The computed relative position is resolved in geographic or north, east and down-(NED) coordinates as follows:

$$\vec{r}_{AB}^{NED} = \begin{bmatrix} r_{North} \\ r_{East} \\ r_{Down} \end{bmatrix} \quad (2)$$

The GPS heading of the relative position vector and hence of the baseline between antennas A and B is given by:

$$\psi_{GPS} = \tan^{-1}\left(\frac{r_{East}}{r_{North}}\right) \quad (3)$$

The top antenna 60 is normally perpendicular to the shaft assembly as shown in FIG. 5, and is rotated by 90 degrees into the horizontal configuration shown in FIG. 7 when it becomes necessary to obtain a heading fix. The lower antenna 104 is fixed permanently in its position with respect to the shaft assembly. The surveyor holds the WSN 10 in its normal position shown in FIG. 5, and configures the WSN for a heading determination by rotating the top antenna and hoisting the WSN into the horizontal position shown in FIG. 7, when the AINS heading accuracy has degraded to a specified threshold of acceptable heading error. The surveyor maintains this position in an area of good GPS coverage for a few minutes, and then resumes the normally vertical WSN orientation when the WSN AINS has recovered its heading accuracy.

An alternative to the GAMS for heading aiding is a magnetic compass or 3-axis magnetometer that senses magnetic heading. The inclusion of a heading aiding sensor in the WSN configuration is dependent on the specified position accuracy of the WSN during a GPS outage, the expected duration of a GPS outage and the quality of the IMU. If the WSN is expected to operate in areas of continuous GPS outage, then a GAMS will not work and a magnetometer heading sensor will be required. Alternatively the WSN can be configured with a high-performance IMU so that the achievable heading error using only zero velocity aiding given in Equation (1) is adequately small.

Technical Details of DR Navigation

The WSN can be described as a standard AINS that accepts GPS measurements as described in "Aerospace Avionics Systems, A Modern Synthesis" referenced above, with the addition of a DR-aiding (dead reckoning) measurement into the Kalman filter during DR navigation. The DR-aiding measurement is called the WSN measurement. The following are the data components that enter the WSN processing algorithm when the spike on the staff 48 is planted in the ground during walking stick manipulation.

$C_b^n$ is the DCM from the b-frame or IMU body frame to the n-frame or INS navigation frame. The n-frame is a locally level reference frame that has an x-y plane that is tangent to the earth's surface and a z-axis that is orthogonal to the earth's surface. The axes are either fixed in direction or allowed to rotate about the orthogonal z-axis. Examples of an n-frame include a North-East-Down frame in which the x-axis points north, the y-axis points east and the z-axis points down, and the North-West-Up frame in which the x-axis points north, the y-axis points west and the z-axis points up. The $C_b^n$ is computed by the inertial navigator at every IMU record time. The computational rate is typically a rate of 50–1000 Hz.

$\vec{l}_{IMU\text{-}GR}^{\,b}$

Is the IGRLA vector resolved in the IMU body frame coordinates or b-frame coordinates. Its components are constant and known by construction of the WSN or by direct measurement.

$\vec{l}_{GR\text{-}IMU}^{\,b} = -\vec{l}_{IMU\text{-}GR}^{\,b}$

Is the Ground Reference to IMU lever arm (GRILA) vector resolved in the IMU body frame, and is the negative of the IGRLA vector. It is defined here for clarity and convenience in the subsequent development.

t1 Is the time at which the surveyor plants the WSN and the ZUPD switch closes. This marks the beginning of a time interval during which the WSN bottom end is stationary and the IMU rotates about the fixed bottom end.

t2 is the time at which the surveyor lifts the WSN and the ZUPD switch opens. This marks the end of the time interval during which the bottom end of survey staff 48 is stationary.

There are two possible methods of constructing a WSN measurement from the above data, identified respectively as the position increment measurement and the ZUPD measurement.

Position Increment Measurement

In a first method, the WSN computes relative IMU position vectors $\vec{\rho}_1^{\,n}$ and $\vec{\rho}_2^{\,n}$ at times t1 and t2 as follows:

$$\vec{\rho}_1^{\,n} = C_b^n(t_1)\vec{l}_{IMU\text{-}GR}^{\,b} \quad (4)$$

$$\vec{\rho}_2^{\,n} = C_b^n(t_2)\vec{l}_{IMU\text{-}GR}^{\,b} \quad (5)$$

For the purpose of identification, the $\vec{\rho}_1^{\,n}$ vector is referred to as a first relative IMU position vector and the $\vec{\rho}_2^{\,n}$ vector is referred to as a second relative IMU position vector and the relative IMU displacement as the difference after time t2 as follows:

$$\Delta\vec{\rho}_{1\text{-}2}^{\,n} = \vec{\rho}_2^{\,n} - \vec{\rho}_1^{\,n} \quad (6)$$

For the purpose of identification, the vector $\Delta\vec{\rho}_{1\text{-}2}^{\,n}$ is referred to as a time synchronized relative IMU displacement vector.

The aided-INS Kalman filter receives the time-synchronized relative IMU displacement $\Delta\vec{\rho}_{1\text{-}2}^{\,n}$ as computed in (6) and the inertial navigation solution displacement vector $\Delta\vec{r}_{SNV1\text{-}2}^{\,n}$ computed as follows:

$$\Delta\vec{r}_{SNV1\text{-}2}^{\,n} = \int_{t_1}^{t_2} \vec{v}_{SNV}^{\,n} dt \quad (7)$$

where $\vec{v}_{SNV}^{\,n}$ is the inertial navigator velocity resolved in the INS navigation frame.

The Kalman filter constructs the position increment measurement which differences the relative IMU displacement with the corresponding inertial navigation solution displacement as follows:

$$\vec{z}_{SNV\text{-}PP} = \Delta\vec{r}_{SNV1\text{-}2}^{\,n} - \Delta\vec{\rho}_{1\text{-}2}^{\,n} \quad (8)$$

This measurement makes the relative displacement errors in the inertial navigator observable to the Kalman filter, as shown in (9) and allows an appropriately designed Kalman filter to estimate and hence regulate these errors. This error regulation mechanism will control the inertial navigator velocity error to be nearly zero and thereby obtain a low position error drift.

$$\vec{z}_{SNV\text{-}PP} = (\Delta\vec{r}_{true}^{\,n} + \delta\Delta\vec{r}_{SNV}^{\,n}) - (\Delta\vec{\rho}_{true}^{\,n} + \delta\Delta\vec{\rho}_n) \quad (9)$$
$$= \delta\Delta\vec{r}_{SNV}^{\,n} - \delta\Delta\vec{\rho}_{1\text{-}2}^{\,n}$$

where $\vec{z}_{SNV-PP}$ is the position increment measurement vector $\Delta \vec{r}_{true}^{n}$ is the true displacement computed by the inertial navigator, $\delta \Delta \vec{r}_{SNV}^{n}$ is the error in the inertial navigator displacement, $\Delta \vec{\rho}_{true}^{n}$ is the true IMU relative displacement, $\delta \Delta \vec{\rho}_{1-2}^{n}$ is the error in the computed IMU relative displacement.

Figure 8A:
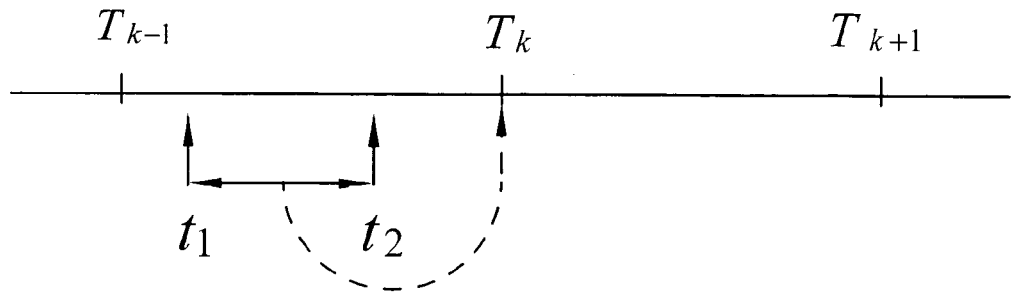
FIG. 8a is a graph showing the occurrence of a position increment interval [t1,t2] occurring between Kalman filter measurement updates.
Figure 8B:
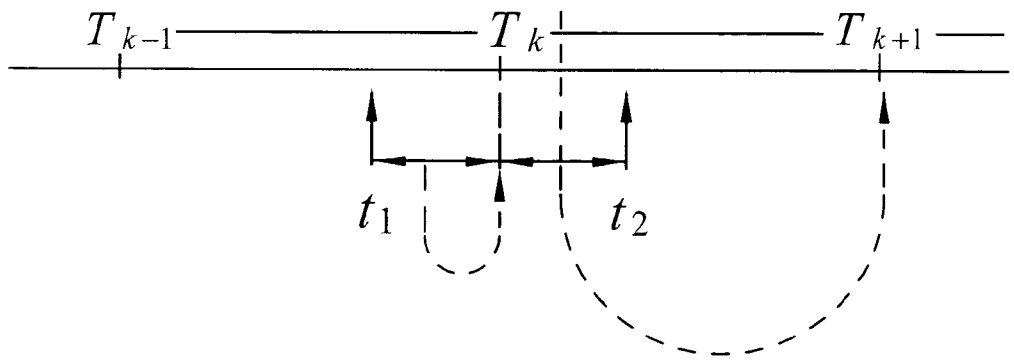
FIG. 8b is a graph showing the occurrence of a position increment interval [t1,t2] occurring over an interval extending from a point in a first Kalman filter interval to a point in time within a successive Kalman filter interval.

The Kalman filter typically performs a measurement update once per second in the AINS configuration shown in FIG. 1. The switch actions occurring at times t1 and t2 are asynchronous and random since they depend on the actions of the surveyor. FIGS. 8*a* and 8*b* show the possible synchronization possibilities that can occur between the synchronous Kalman filter and the asynchronous position increment start and end times. Let ( . . . , Tk−1, Tk, Tk+1, . . . ) denote the synchronous Kalman filter measurement update times. FIG. 8*a* shows times t1 and t2 occurring between Kalman filter measurement updates at times Tk−1 and Tk so that $T_{k-1} < t_1 < t_2 < T_k$, then the complete position increment measurement is constructed as described in equations (8). The Kalman filter processes the measurement during the measurement update at time Tk. FIG. 8*b* shows that if a Kalman filter measurement update time Tk falls between t1 and t2 so that $t_1 < T_k < t_2 < T_{k+1}$, then the position increment interval [t1, t2] is broken up into two intervals [t1, Tk] and [Tk, t2] and each handled as individual position increment measurements using the previous algorithm. The Kalman filter processes the position increment measurement over the interval [t1, Tk] at the measurement update time Tk, and processes the position increment measurement over [Tk, t2] at the measurement update time Tk+1.

ZUPD Measurement

In a second method, the WSN computes the relative IMU velocity with respect to the stationary ground reference point at each Kalman filter cycle time between times t1 and t2 as follows:

$$\vec{v}_{GR-IMU}^{n} = C_b^n(\vec{\omega}_{IMU}^{b} \times \vec{l}_{GR-IMU}^{b}) \quad (10)$$
$$= -C_b^n(\vec{\omega}_{IMU}^{b} \times \vec{l}_{IMU-GR}^{b})$$

where $\vec{v}_{GR-IMU}^{n}$ vector is identified as the relative IMU velocity vector and the $\vec{\omega}_{IMU}^{b}$ vector is the angular rate of the IMU as measured by the gyros and corrected for Earth rate.

The Kalman filter constructs the ZUPD velocity measurement vector, which is obtained by taking the difference between the relative IMU velocity from Equation (10) and the equivalent inertial velocity $\vec{v}_{SNV}^{n}$ from the INS as follows:

$$\vec{z}_{SNV-ZV} = \vec{v}_{SNV}^{n} - \vec{v}_{GR-IMU}^{n} \quad (11)$$

This measurement makes the velocity errors in the inertial navigator observable to the Kalman filter, as is shown in (12), and allows an appropriately designed Kalman filter to estimate and hence regulate these errors. This error regulation mechanism will control the inertial navigator velocity error to be nearly zero and thereby obtain a low position error drift.

$$\vec{z}_{SNV-ZV} = (\vec{v}_{true}^{n} + \delta\vec{v}_{SNV}^{n}) - (\vec{v}_{true}^{n} + \delta\vec{v}_{GR-IMU}^{n}) \quad (12)$$
$$= \delta\vec{v}_{SNV}^{n} - \delta\vec{v}_{GR-IMU}^{n}$$

Figure 9:
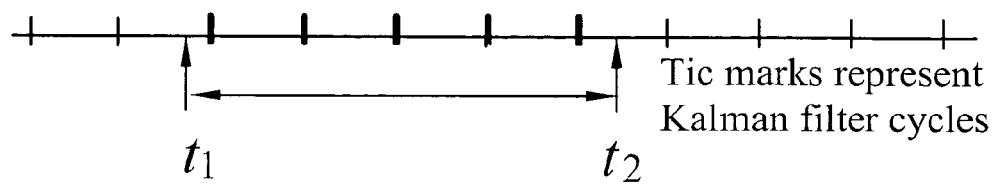
FIG. 9 is a graph showing the occurrence of a ZUPD interval [t1,t2] that extends over a period containing six Kalman filter intervals.

The Kalman filter processes the measurement (11) from the time t1 when the surveyor plants the WSN and the ZUPD switch closes to the time t2 when the surveyor lifts the WSN and the ZUPD switch opens. FIG. 9 shows the concept of running the Kalman filter with a sample period that is much shorter than the time interval between the times t1 and t2. To achieve synchronization of the asynchronous ZUPD during times t1 and t2 with the synchronous Kalman filter measurement updates, the Kalman filter must run at a sufficiently high rate to capture the measurements. A Kalman filter iteration rate of 10 iterations per second should be sufficient.

Application and Use of the Invention

The WSN can be used in any application that requires mobile surveying or mapping and where GPS coverage is dubious. This includes all forms of land surveying and seismic surveying. It can also be used for cadastral surveying if position accuracies on the order of 10 cm can be maintained, and asset surveying (signs, manhole covers, light posts, etc.) in urban centers, and for positioning items inside buildings.

A key attribute of the WSN is the "look and feel" of a standard GPS survey instrument, which makes the products familiar and hence attractive to surveyors who use GPS survey instruments. The WSN thus provides a survey capability that extends the range of operation of a GPS survey instrument into areas with partial or no GPS coverage.

Figure 10:
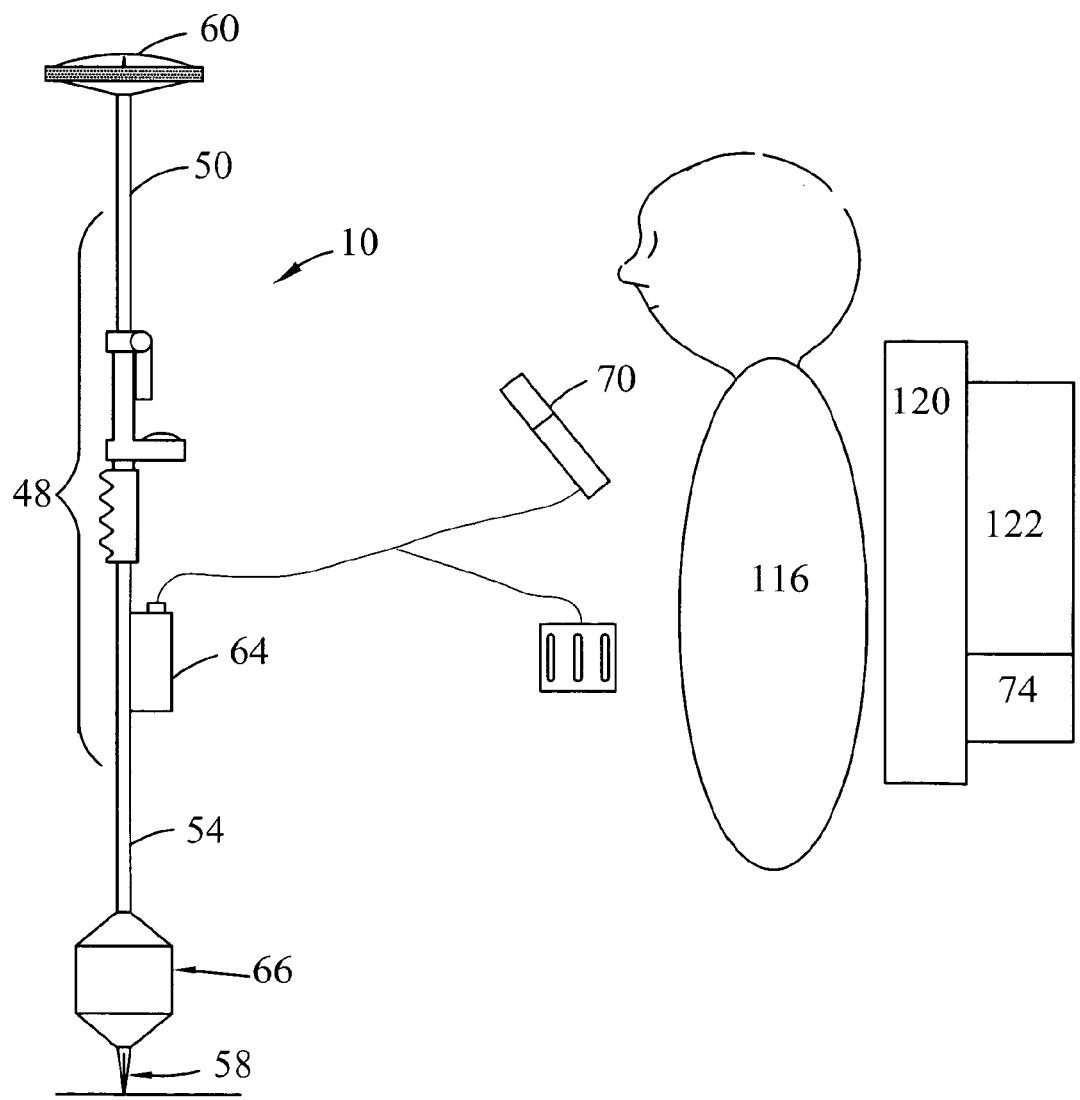
FIG. 10 is a schematic drawing showing a WSN with a backpack.

FIG. 10 to FIG. 14 are intended to show the system components and process steps used in a basic WSN reduction to practice. FIG. 10 shows the hardware elements that are combined to make a basic WSN 10. This configuration contains only the components necessary to form a WSN. FIG. 10 does not show enhancements such as the GAMS described previously. FIG. 10 shows a configuration that includes the surveying staff 48, a backpack 120 for carrying the power source (batteries) 74 and additional electronics 122. All of the components could be placed on the surveying staff 48 if the components were sufficiently small and light. In FIG. 10, the backpack frame 120 is a platform on which the components are mounted.

The WSN staff assembly comprises the surveying staff 48, GPS antenna and GPS antenna 60, the IMU housing 66 that also contains the ZUPD switch. The CDU 70 can optionally be attached to the staff or held separately by the surveyor 116.

The NCS 64 includes an interface that imports the digital data from the IMU located inside of the IMU housing 66 and from the GPS receiver, the ZUPD switch, and software that implements the previously described algorithms. The navigation computer system (NCS) 64 can be located either in the backpack 120 or on the surveyor staff 48, depending on its size and weight. The embedded software in the NCS 70 runs the WSN processing algorithm that implements the WSN solution in FIG. 14.

The WSN 10 surveyors staff assembly is carried and manipulated in FIGS. 6 and 7 by a surveyor 110, 110*a*, 110*b* as the surveyor moves along a path to be surveyed. With a loss of acceptable GPS Data, the surveyor positions the lower end of the staff assembly, terminating in a ground spike 58, at a stationary point 112 on the ground at the start of a stride or step. The surveyor or operator pivots the staff assembly around the stationary point substantially in the direction of surveyor movement. The surveyor lifts the staff assembly 48 and repositions the lower end of the staff, the ground spike 58, to further stationary point beyond the surveyor's advancing foot, in the direction of the surveyor movement. At the conclusion of a stride, the surveyor repeats the sequence. The AINS 20, explained in connection with the block diagram of FIG. 1, is coupled to and aligned on the staff assembly. A switch means, such as the ZUPD switch 94 shown in FIG. 3, is coupled to the lower end of the staff assembly via top cap 78, enclosure cylinder 80, lower cap 84, plunger 98 and spring 96. The plunger must be arranged to force or compress the ZUPD switch 94 slightly as the ground spike contacts the ground and begins to support the weight of the staff assembly.

A flexure (not shown) is formed as a flexure region in the bottom cap to permit the ground spike to be free to travel in a guide into the housing and against the switch 94. The spring 96 would restore the ground spike to an extended position and release the switch to the open position as the surveyor lifts the shaft 48. The ZUPD switch 94 provides a stationary interval signal while transferred to the closed position, or to the open position, indicating that the ground spike 58 is on the ground and supporting the staff assembly 48. Transfer of the ZUPD switch 94 during the period that the ground spike is in contact with the ground characterizes each successive stationary interval.

The WSN has a digital computer running a program solving a position aiding algorithm. The digital computer required may be provided by a portion of the navigational computer system 64 or the digital computer subsystem that provides all navigation and data processing by running a program. The digital computer is coupled to be responsive to AINS output signals, such as present position for the calculation of IMU relative position vectors with Equations 4 and 5. The inertial navigator velocity is integrated in Equation (7) to provide the inertial navigation displacement. The stationary interval signals are the time intervals during which the ground spike is supporting the staff assembly 48 and the ZUPD switch is transferred. The program solving the position aiding algorithm solves Equations such as (9) or (10) to provide at least one aiding input to the AINS for each successive stationary interval.

In the embodiment of FIG. 3, the switch means further comprises a micro-switch 94 for the switch means coupled to the lower end of the staff assembly 54 and more particularly to a location between the ground spike 58 and the IMU mounting plate 82 where a slight flexure might be sensed due to movement of the ground spike in relation to the bottom cap 84 or in relation to a flexure of the bottom cap 84.

The switch means also has a spring-restored plunger in contact with the switch. The switch means has a frame such as the top cap, enclosure cylinder, bottom cap and IMU mounting plate group that is coupled to the lower end of the staff assembly. The frame has a cylindrical or receiving hole. The plunger resides in the hole. A spring restores the plunger when the shaft is raised and the ground spike contact with the ground is lost. The plunger is transferred further into the cylindrical hole by operation of the ground spike making contact with the ground. The plunger motion transfers the ZUPD switch transferring an electrical contact to provide a measure of the duration of the stationary interval signal. A piezo electric transducer between the plunger and the frame is an alternative to the micro-switch.

The position measurement process receives AINS output signals that are used to provide a position increment measurement vector during a portion of each step, for each respective stationary interval. The position increment measurement vector is used by the AINS for controlling position error drift. The AINS has a Kalman filter designed be responsive to a position increment measurement vector $\vec{z}_{SNV\text{-}PP}$ for each stationary period for estimating and regulating position and velocity vector errors to obtain a low position error drift. Some of the equations numbered 1–12 introduced earlier will now be restated with their original equation number unchanged for the convenience of the reader. The Kalman filter computes a position increment measurement vector $\vec{z}_{SNV\text{-}PP}$ for each stationary interval by the following three process steps:

Step 1: The Kalman filter computes the relative IMU position vectors $\vec{\rho}_1^n$ and $\vec{\rho}_2^n$ at times t1 and t2 as follows. At time t1, as the ZUPD switch closes, the process computes:

$$\vec{\rho}_1^n = C_b^n(t_1)\vec{l}_{IMU\text{-}GR}^b \tag{4}$$

At page 35, line 19, add (5) after the equation as follows:

$$\vec{\rho}_2^b = C_b^n(t_2)\vec{l}_{IMU\text{-}GR}^b \tag{5}$$

At page 36, line 5, add (6) after the equation as follows:

$$\Delta\vec{\rho}_{1\text{-}2}^n = \vec{\rho}_2^n - \vec{\rho}_1^n \tag{6}$$

At page 36, line 10, add (7) after the equation as follows:

$$\Delta\vec{r}_{SNVI\text{-}2}^n = \int_{t_1}^{t_2} \vec{v}_{SNV}^n \, dt \tag{7}$$

At page 36, line 20, add (8) after the equation as follows:

$$\vec{z}_{SNV\text{-}PP} = \Delta\vec{r}_{SNVI\text{-}2}^n - \Delta\vec{\rho}_{1\text{-}2}^n \tag{8}$$

At page 37, line 20, amend the equation to fit on two lines as shown below and add (10) after the equation as follows:

$$\vec{v}_{GR\text{-}IMU}^n = C_b^n(\vec{\omega}_{IMU}^b \times \vec{l}_{GR\text{-}IMU}^b) \tag{10}$$
$$= -C_b^n(\vec{\omega}_{IMU}^b \times \vec{l}_{IMU\text{-}GR}^b)$$

At time t2 as the ZUPD switch opens, the process computes:

$$\vec{\rho}_2^n = C_b^n(t_2)\vec{l}_{IMU\text{-}GR}^b \tag{5}$$

Step 2: The Kalman filter uses results of the two preceding computations to compute the relative IMU displacement as the measured difference vector after time t2 as follows:

$$\Delta\vec{\rho}_{1\text{-}2}^n = \vec{\rho}_2^n = \vec{\rho}_1^n \tag{6}$$

Step 3: The program computes the inertial navigation solution for the relative IMU displacement vector $\Delta\vec{r}_{SNVI\text{-}2}^n$ for the interval from t1 to t2 as follows:

$$\Delta\vec{r}_{SNVI\text{-}2}^n = \int_{t_1}^{t_2} \vec{v}_{SNV}^n \, dt \tag{7}$$

where $\vec{v}_{SNV}{}^n$ is the inertial navigator velocity vector resolved in the INS navigation frame.

Step 4: The process then uses the preceding results of this iteration to compute the position increment measurement vector $\vec{z}_{SNV\text{-}PP}$ by taking the difference between the relative IMU displacement vector and the corresponding inertial navigation vector as:

$$\vec{z}_{SNV\text{-}PP} = \Delta \vec{r}_{SNV1\text{-}2}{}^n - \Delta \vec{\rho}_{1\text{-}2}{}^n \qquad (8)$$

Step 5: The Kalman filter 28 then uses the position increment measurement vector $\vec{z}_{SNV\text{-}PP}$ to estimate and regulate velocity errors to be nearly zero and to obtain a low position error drift.

In the alternative, the program for solving a position aiding algorithm also comprises a velocity measurement program that receives AINS output gyro rate signals that are used to calculate and provide a relative IMU velocity vector $\vec{v}_{GR\text{-}IMU}{}^n$ to the AINS during a portion of each step for each respective stationary interval to control the position error drift. The Kalman filter is designed to receive or construct the ZUPD velocity measurement vector $\vec{z}_{SNV\text{-}ZV}$ for each stationary interval and use it for estimating and regulating position and velocity vector errors to obtain a low position error drift. The Kalman filter computes the ZUPD velocity measurement vector or ZPUD measurement vector $\vec{z}_{SNV\text{-}ZV}$ for each stationary interval by the following process steps.

Step 1: The Kalman filter computes the relative IMU velocity with respect to the stationary ground reference point at each Kalman filter cycle time between times t1 and t2 via the following equation:

$$\vec{v}^n_{GR\text{-}IMU} = C^n_b(\vec{\omega}^b_{IMU} \times \vec{l}^b_{GR\text{-}IMU}) \qquad (9)$$
$$= -C^n_b(\vec{\omega}^b_{IMU} \times \vec{l}^b_{IMU\text{-}GR})$$

where $\vec{\omega}_{IMU}{}^b$ is the angular rate of the IMU as measured by the gyros and corrected for Earth rate.

Step 2: The ZUPD measurement vector is calculated by taking the difference between the relative IMU velocity from Step 1 and the inertial navigator velocity vector $\vec{v}_{SNV}{}^n$ from the AINS as follows:

$$\vec{z}_{SNV\text{-}ZV} = \vec{v}_{SNV}{}^n = \vec{v}_{GR\text{-}IMU}{}^n \qquad (10)$$

Step 3: The Kalman filter uses the ZUPD measurement vector $\vec{z}_{SNV\text{-}ZV}$ to estimate and regulate position and velocity errors to be nearly zero and to obtain a low position error drift. For acceptable results, the Kalman filter performs the ZUPD velocity measurement vector $\vec{z}_{SNV\text{-}ZV}$ process at an iteration rate of at least 10 iterations per second during the stationary interval between the time t1 when the surveyor plants the WSN and the ground switch closes and the time t2 when the surveyor lifts the WSN and the ground switch opens.

Figure 11:
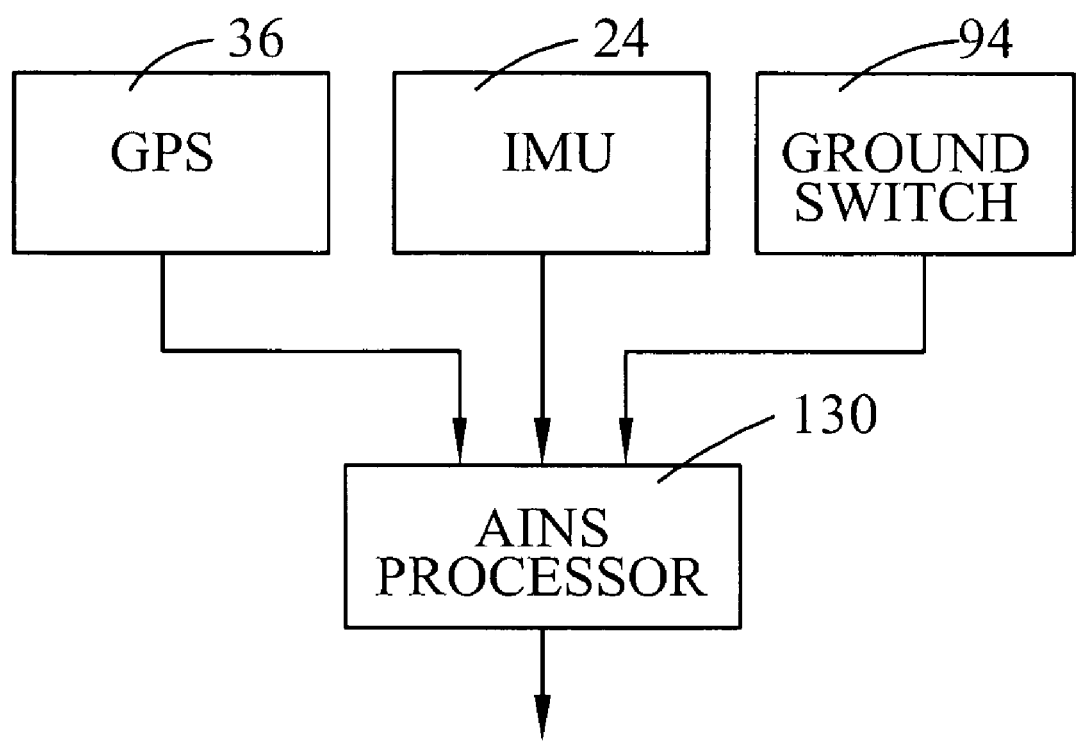
FIG. 11 is a schematic drawing of a WSN functional block diagram.

FIG. 11 is a functional block diagram of a WSN reduction to practice. The following components are identified. The GPS block 36 comprises the GPS antenna 60 and a receiver. It can also include a radio modem that receives differential corrections that improve the position accuracy of the GPS receiver. The GPS block provides position and velocity fixes at the GPS data rate, typically 1–20 samples per second. The IMU block 24 represents the IMU and data cable. The IMU block includes the IMU 24 shown in FIG. 1. Block 24 provides acceleration and angular rate vector samples at 50–1000 samples per second, depending on the IMU. The ground switch block 94 represents the ZUPD switch and its function. Block 94 comprises the ZUPD switch (not shown) at the bottom end of the surveying staff 48 and the electronics to generate a reliable ON/OFF signal. It also includes the electronics to establish the time of transitions between ON and OFF states relative to the IMU and GPS data so that the ON/OFF transitions are synchronized in time with the IMU and GPS data. The AINS processor 130 receives digital data from the IMU 24 and the GPS block 36 and implements the WSN processing algorithm shown in FIG. 14.

Figure 12:
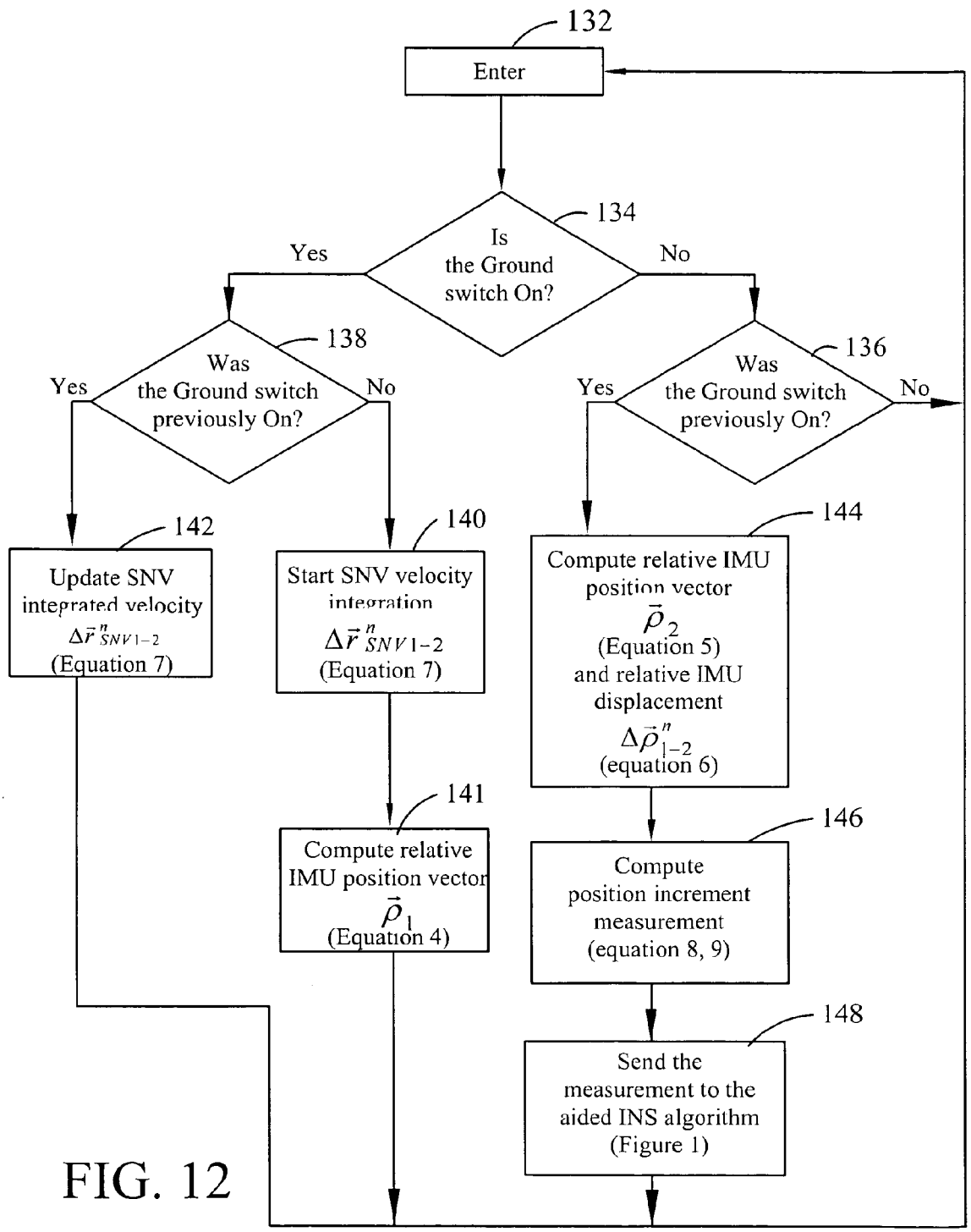
FIG. 12 is a flow chart for a position increment measurement algorithm.

FIG. 12 is a flow chart that shows the steps performed in a position increment measurement algorithm. The algorithm begins at the Enter block 134 and advances to decision block 134 where the program tests to determine if the ZUPD switch is in the ON state. If the test results in a NO response, the program advances to the right to decision block 136 where the program tests to see if the ZUPD switch was previously ON. If the answer is NO, the program loops back to Enter block 132. The same sequence is followed while the survey staff 48 is in flight and is not planted. DR information is not available for processing during this interval.

As the algorithm advances to decision block 134 and the ZUPD switch is ON, the program exits to the left to decision block 138 where the program determines if the ZUPD switch was previously ON. If the answer is NO, then the present pass is the first instant of a plant of the ZUPD switch 94, so the program advances to the right to block 140 and commands the start of SNV velocity integration that will yield the inertial navigation solution using Equation 7. At this time the algorithm initializes the integration Equation (7) and computes the first relative IMU position vector given in Equation (4). On subsequent iterations through decision block 138, the process branches to the left and passes through block 142 on a YES decision and repetitively updates the velocity integral via Equation (7) while the ZUPD switch 94 remains in the ON or closed state. When the ZUPD switch transitions from the ON to OFF state, the algorithm or process exits decision block 134 and branches to the right to decision block 136. If the ZUPD switch had been previously ON, the process knows by this test, that this is the first instant after the surveyor has lifted the surveying staff signaling the end of the step and marking the time t2, so the process branches to the left to block 144. In block 144, the process computes the second relative IMU position vector given in Equation (5) and the relative IMU displacement via Equation (6). The algorithm then advances to block 146 and constructs the relative position increment measurement via Equation (8, 9). The process then advances to block 148 and passes the relative position increment measurement to the AINS Kalman filter. The AINS Kalman filter treats the measurement like other measurements, and thereby derives an improved estimate of INS errors.

This algorithm is performed at a high rate, typically at the IMU rate of 50–200 calls per second, to ensure timely sampling of the ZUPD switch state. It generates the measurement whenever the ZUPD switch state transitions from ON to OFF. If the ZUPD switch remains ON for an extended time period, for example if the surveyor leaves the WSN propped against a tree with the ZUPD switch closed, then the algorithm will generate a measurement and restart once per Kalman filter iteration so that the Kalman filter receives measurements periodically and the AINS algorithm is able to control the INS errors on a regular basis. This is the equivalent of providing the position increment measurement algorithm with an artificial ZUPD switch state transition from ON to OFF at the Kalman filter iteration time, and then from OFF to ON at the next iteration of the measurement algorithm.

Figure 13:
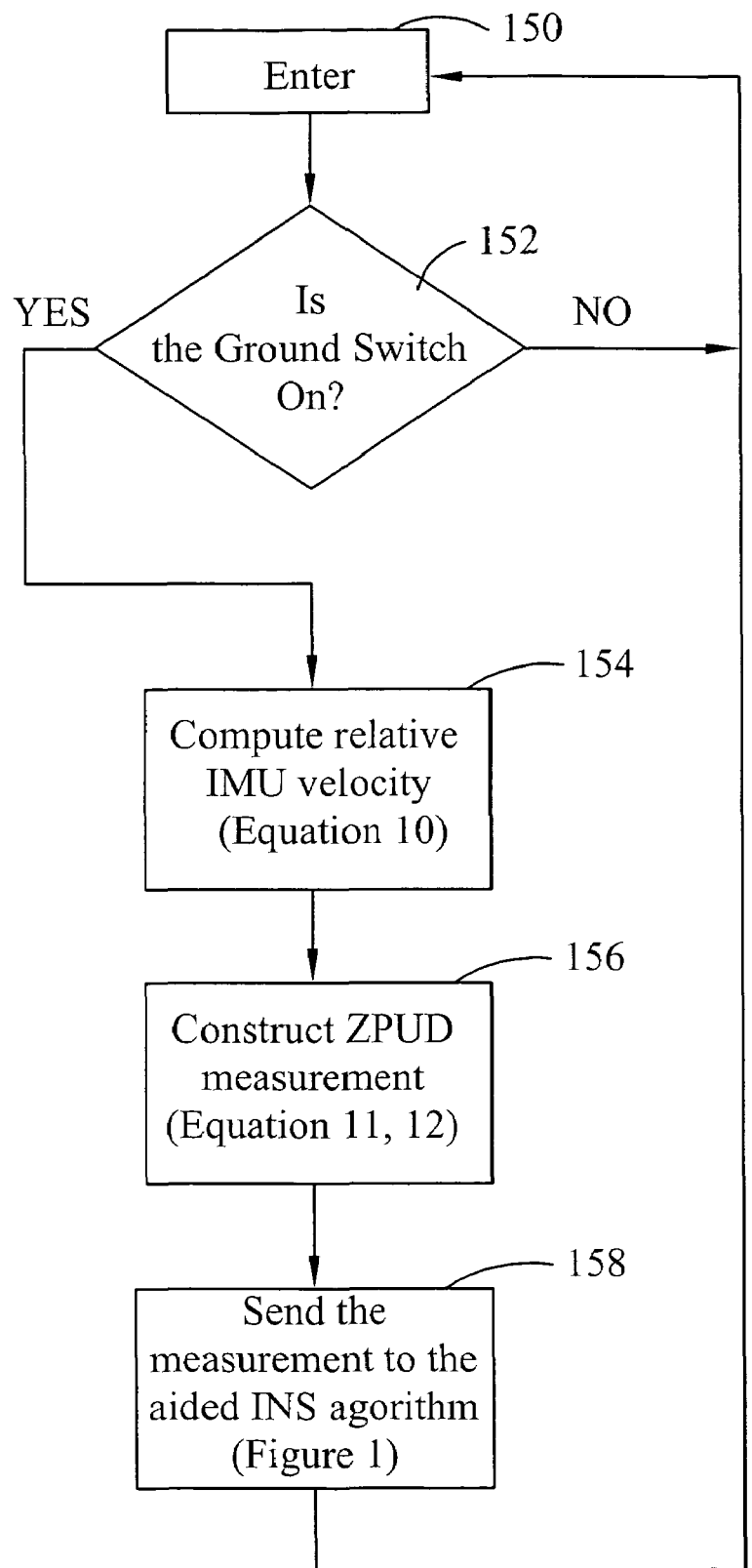
FIG. 13 is a flow chart for a ZUPD measurement algorithm.

FIG. 13 shows the ZUPD measurement algorithm. The process begins with the Enter block 150. The process advances to decision block 152 and asks if the ZUPD switch is ON. If the ZUPD switch 94 is ON, the process exits to the left to block 154 where the process computes the relative IMU velocity with respect to the stationary ground reference point into which the ground spike is placed. The computations begin as the ZUPD switch transitions from the OFF to ON state. The algorithm computes the relative IMU velocity using Equation (10). The process then advances to block 156 to construct the ZUPD measurement using Equation (11, 12). The resulting measurements are passed to the AINS Kalman filter in block 158 on every iteration of the IMU system, typically 50 to 500 times per second.

In Equation 11, the Kalman filter constructs the ZUPD measurement by taking the difference between the relative IMU velocity from Equation (10) and the equivalent inertial velocity $\vec{v}_{SNV}{}^n$ from the INS. This measurement makes the velocity errors in the inertial navigator observable to the Kalman filter, as is shown in Equation (12). The Kalman filter is designed to estimate and hence regulate these errors. This regulation mechanism will control the inertial navigator velocity error to be nearly zero and thereby obtain a low position error drift.

The Kalman filter will process the measurement from Equation (11) from the time t1 when the operator plants the WSN and the ZUPD switch closes to t2 when the operator lifts the WSN and the ZUPD switch opens. As shown in FIG. 9, to achieve synchronization of the asynchronous ZUPD calculations during period extending from times t1 to t2 with the synchronous Kalman filter measurement updates, the Kalman filter must run at a sufficiently high rate to capture the measurements. A filter rate of 10 iterations per second should be sufficient. FIG. 9 shows the concept.

The Kalman receives and uses the ZUPD measurement information at the lower Kalman iteration rate, typically 1 to 5 iterations per second. It is believed that this method of ZUPD measurement generation in an AINS can be used as an alternative method to that taught in the PPAINS (Precise Pedometer Aided Inertial Navigation System) described in U.S. Pat. No. 6,594,617.

The method of ZUPD measurement generation via the use of an IGRLA vector 106 and the output of rate gyros was not believed to be practical at the time of filing the application for U.S. Pat. No. 6,594,617 because of its dependency on accurate and noise-free angular rate measurements. It was believed at the time that the long relative position vector lengths measured by SBPMS in the PPN described in U.S. Pat. No. 6,594,617 for a Pedometer Navigator System, when used to take a cross product with a noisy angular rate vector would generate significant relative velocity errors. However, in the present embodiment, the WSN IMU is positioned near the ZUPD switch at the lower end of the shaft assembly 48 which results in a very short IGRLA vector 106, the relative position vector. The relative velocity is therefore significantly less sensitive to angular rate errors and noise.

Figure 14:
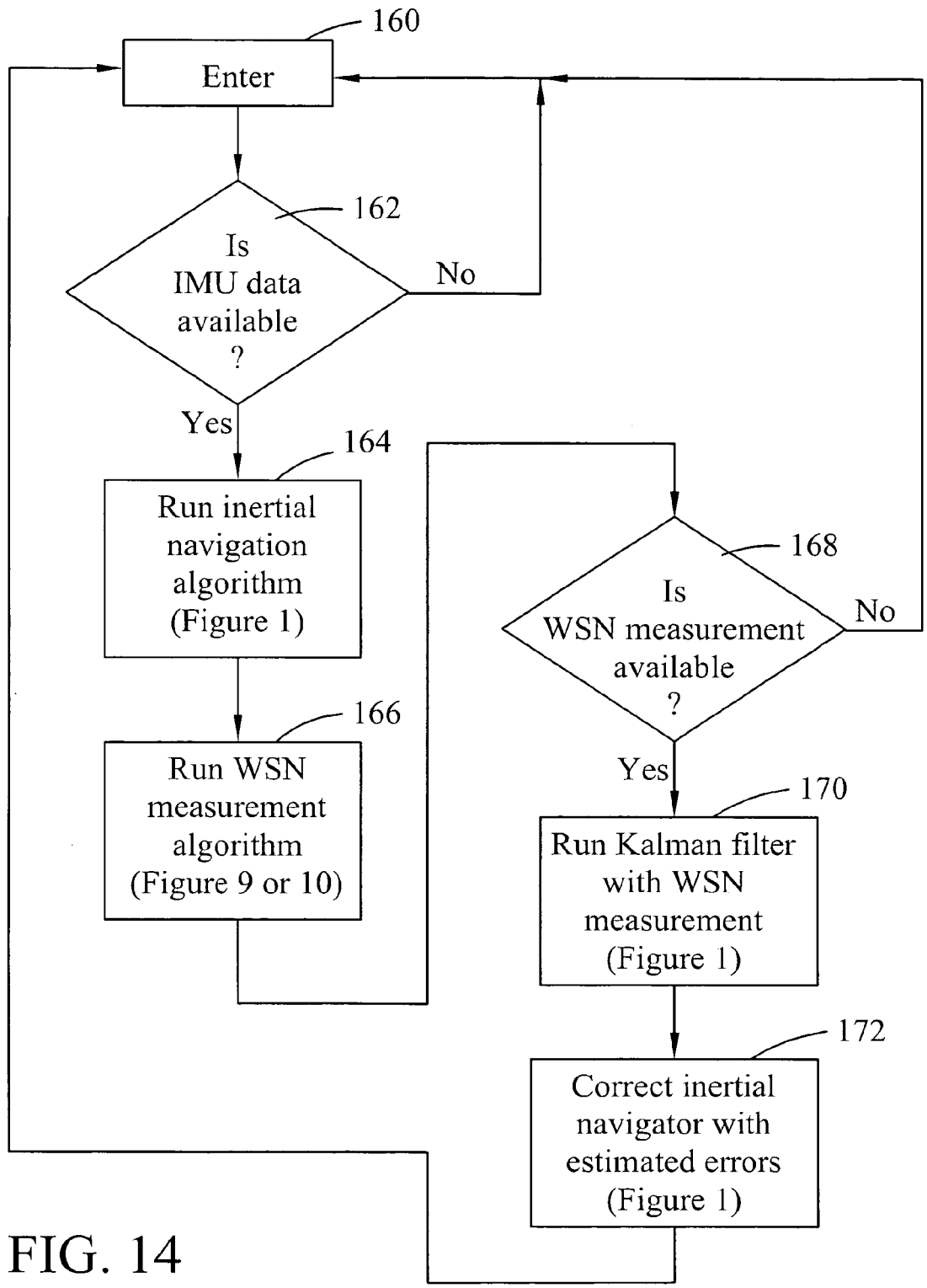
FIG. 14 is a flow chart for a WSN processing algorithm.

FIG. 14 shows processing algorithm used by a WSN that is aiding an AINS such as that shown in FIG. 1. AINS systems can be aided by the outputs of a WSN, which can be either the position increment measurement shown in FIG. 12 or the ZUPD measurement shown in FIG. 13. The measurement to use will depend on the quality and availability of the data components going into the measurement algorithm. The ZUPD measurement has the advantage of being computed continuously at or above the Kalman filter iteration rate, and has the disadvantage of being sensitive to the noise in the angular rate vector. The position increment measurement has the disadvantage of being unsynchronized with a Kalman filter that iterates at a fixed rate, but has the advantage of being insensitive to the angular rate vector. The measurement is treated independently as those from "other aiding sensors" in FIG. 1. FIG. 14 does not show other aiding measurements from other aiding data, such as a GPS receiver, to keep the figure simplified.

The process of FIG. 14 begins with the Start or Enter block 160. The process advances to decision block 162 and determines if the IMU data is available. If the answer is NO, indicating that the iteration interval for the IMU is incomplete, the process advances to the right through the NO branch and returns through the enter block 162 and continues to wait for a YES response out of the decision block 162. The IMU data includes angular rates and accelerometer outputs for integration.

The program advances from block 162 in response to a YES result, to the next block 164 and runs the inertial navigation algorithm after which an output is provided on the output bus of FIG. 1. The program then advances to block 166 and runs the WSN measurement via Equation (9) to compute a position increment measurement for the interval from t1 to t2, or via Equation (10) to compute a series of relative velocities with respect to a fixed point. The program then advances to decision block 168 and tests to see if the WSN measurement is available. If the answer is NO, the program loops back to the Enter block 160 and cycles back through 162, 164, 166 and 168 repeatedly until a YES response is obtained, after which the program advances to block 170 and passes the measurement data to the Kalman filter 28 in FIG. 1. The Kalman filter 28 runs with the WSN measurement and provides an output to the error controller 32. The program then advances to block 172 captioned with the legend "Correct inertial navigator with estimated errors (FIG. 1)", which represents the program of the error controller combining the estimated errors from the Kalman filter 28 with the outputs of the INS 22 to provide a blended navigational solution that is prepared for incrementing with outputs from the IMU 24. The program leaves block 172 and returns to the Enter block 160 and begins a waiting period for a subsequent iteration of new data from the next IMU increment output in block 162.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

What is claimed is:

1. A walking stick navigator (WSN) on a staff having a lower end, and a top end, the WSN being carried by a surveyor and comprising:

an Aided Inertial Navigation System (AINS) coupled to the staff, the AINS having an IMU providing inertial outputs, a switch coupled to the lower end to provide a contact signal indicating when the lower end of the staff assembly is stationary, the contact signal defining the duration of a stationary interval, a GPS receiver and antenna attached to the staff, the GPS receiver being coupled to provide a first aiding signal to the AINS, a digital computer running a position measurement program solving a position aiding algorithm responsive to the IMU outputs and the contact signal, the position measurement program providing a second aiding signal to the AINS.

2. The WSN of claim 1 wherein the position measurement program further comprises the step of using an algorithm for calculating a position increment measurement vector $\vec{z}_{SNV\text{-}PP}$ by the steps of:

calculating a first relative IMU position vector $\vec{\rho}_1{}^n$ at the beginning of the contact signal and a second relative IMU position vector $\vec{\rho}_2{}^n$ at the conclusion of the contact signal and calculating a time synchronized relative IMU displacement vector $\Delta\vec{\rho}_{1\text{-}2}{}^n$ from the difference between the second relative IMU position vector $\vec{\rho}_2{}^n$ and the first relative IMU position vector $\vec{\rho}_1{}^n$, obtaining the inertial navigation solution displacement vector $\Delta\vec{r}_{SNV1\text{-}2}{}^n$ for the contact signal interval from the inertial navigation system and calculating the position increment measurement vector $\vec{z}_{SNV\text{-}PP}$ from the difference between the inertial navigation solution displacement vector $\Delta\vec{r}_{SNV1\text{-}2}{}^n$ and the time synchronized relative IMU displacement vector $\Delta\vec{\rho}_{1\text{-}2}{}^n$.

3. The WSN of claim 1 wherein the position measurement program further comprises:

a Kalman filter having an iteration rate, and an algorithm for calculating a zero-velocity update (ZUPD) measurement having an IMU-to-Ground switch Relative Lever Arm (IGRLA) vector input defining the location of an IMU on the shaft assembly with respect to the lower end of the shaft assembly, the algorithm calculating a relative IMU velocity vector $\vec{v}_{GR\text{-}IMU}{}^n$ with respect to stationary ground at each Kalman filter cycle time from the beginning of the contact signal until the end of the contact signal by taking the cross product of an angular rate of the IMU with the IGRLA vector while in contact with the ground, and multiplying each respective cross product by the direction cosine matrix for a body to the navigational reference system, the program then constructing the ZUPD measurement by subtracting the relative IMU velocity vector $\vec{v}_{GR\text{-}IMU}{}^n$ from an equivalent inertial navigator velocity vector $\vec{v}_{SNV}{}^n$ obtained from the AINS.

4. The WSN of claim 1 wherein the

Global Position Satellite (GPS) receiver and antenna are mounted on the top end of the staff to provide acceptable GPS position aiding signals to the AINS, the surveyor moving along a path to be surveyed, the surveyor carrying the staff assembly with the lower end above the ground during intervals in which acceptable GPS position aiding signals to the AINS are available.

5. The WSN of claim 1 wherein the GPS receiver attached to the staff assembly provideds GPS aiding signal to the AINS as the surveyor moves along a path to be surveyed, the surveyor carrying the staff assembly without contact with the ground during intervals when an acceptable GPS signal is available, the AINS being aided by GPS data, and during intervals in which an acceptable GPS aiding signal is not available, the surveyor manipulating the staff assembly as a walking stick while the surveyor is walking, the surveyor bringing the lower end of the shaft assembly into contact with the ground, the switch providing the contact signal, the position measurement program being responsive to the contact signal and coupled to the AINS output signals to provide at least one aiding input signal to the AINS for each successive stationary interval.

6. A walking stick navigator (WSN) apparatus comprising:

a staff assembly having a lower end and a top end, the staff assembly being carried by a surveyor moving along a path to be surveyed, the surveyor positioning the lower end of the staff assembly at a stationary point on the ground at a start of a stride, and pivoting the staff assembly around the stationary point in the direction of surveyor movement, the surveyor lifting the staff assembly and repositioning the lower end of the staff assembly to a stationary point in the direction of surveyor movement at the conclusion of the stride, a sequence being repeated with each successive stride interval, an Aided Inertial Navigation System (AINS) coupled to and aligned on the staff assembly, the AINS system providing output signals comprising position, velocity and platform angle signals, a first GPS receiver positioned to be close to the top end of the staff, the first GPS receiver being coupled to provide a first aiding signal to the AINS, and a second GPS receiver positioned to be close to the bottom end of the staff, the second GPS receiver being coupled to provide a second aiding signal to the AINS, a switch means coupled to the lower end of the staff assembly for providing stationary interval signals characterizing each successive stationary interval, and a digital computer coupled to be responsive to AINS output signals and to the stationary interval signals running a program solving a position aiding algorithm providing at least one aiding input to the AINS for each successive stationary interval.

7. The WSN of claim 6 wherein the switch means further comprises:

a micro-switch switch means coupled to the lower end of the staff assembly and characterized to provide the stationary interval signal during the period that the lower end is in contact with the ground.

8. The WSN of claim 6 wherein the switch means further comprises:

a spring restored plunger switch having a frame coupled to the lower end of the staff assembly, the frame having a cylindrical hole, and a spring restored plunger residing therein, the plunger being transferred into the cylindrical hole by contact with the ground, the motion of the plunger transferring an electrical contact to provide the stationary interval signal.

9. The WSN of claim 6 wherein the AINS further comprises a Kalman filter designed be responsive to the position increment measurement vector $\vec{z}_{SNV\text{-}PP}$ for each stationary period for estimating and regulating position and velocity vector errors to obtain a low position error drift.

10. The WSN of claim 6 wherein the program solving a position aiding algorithm further comprises:
a position measurement program responsive to the AINS output signals for providing a position increment measurement vector $\vec{z}_{SNV-PP}$ during a portion of each step for each respective stationary interval, to the AINS for controlling position error drift.

11. The WSN of claim 9 wherein the Kalman filter computes the position increment measurement vector $\vec{z}_{SNV-PP}$ for each stationary interval by the following four steps:
1. the Kalman filter computes
a first relative inertial measurement unit (IMU) position vector $\vec{\rho}_1^n$ and
a second relative inertial measurement unit (IMU) position vector at $\vec{\rho}_2^n$ at times t1 and t2 as follows:

$$\vec{\rho}_1^n = C_b^n(t_1)\vec{l}_{IMU-GR}^b$$

$$\vec{\rho}_2^n = C_b^n(t_2)\vec{l}_{IMU-GR}^b$$

in which $C_b^n$ is a direction cosine matrix (DCM) from the b-frame or IMU body frame to the n-frame or INS navigation frame,
2. the Kalman filter computes a time synchronized relative IMU displacement vector after time t2 as follows:

$$\Delta\vec{\rho}_{1-2}^n = \vec{\rho}_2^n - \vec{\rho}_1^n$$

3. the Kalman filter computes an inertial navigation solution displacement vector $\Delta\vec{r}_{SNV1-2}^n$ for the interval from t1 to t2 as follows:

$$\Delta\vec{r}_{SNV1-2}^n = \int_{t_1}^{t_2} \vec{v}_{SNV}^n \, dt$$

where $\vec{v}_{SNV}^n$ is an inertial navigator velocity vector resolved in an INS navigation frame, and
4. the Kalman filter computes the position increment measurement vector $\vec{z}_{SNV-PP}$ by taking the difference between the time synchronized relative IMU displacement vector $\Delta\vec{\rho}_{1-2}^n$ and the inertial navigation solution displacement vector $\Delta\vec{r}_{SNV1-2}^n$ as:

$$\vec{z}_{SNV-PP} = \Delta\vec{r}_{SNV1-2}^n - \Delta\vec{\rho}_{1-2}^n$$

whereby the Kalman filter uses the position increment measurement vector $\vec{z}_{SNV-PP}$ to estimate and regulate position and velocity errors to be nearly zero and to obtain a low position error drift rate.

12. The WSN of claim 11 wherein the position aiding algorithm further comprises:
a velocity measurement program responsive to the AINS output signals for providing a relative IMU velocity vector $\vec{v}_{GR-IMU}^n$ to the AINS during a portion of each step for each respective stationary interval to control the position error drift.

13. The WSN of claim 12 wherein the AINS comprises:
a Kalman filter designed to be responsive to a ZUPD velocity measurement vector $\vec{z}_{SNV-ZV}$ for each stationary interval for estimating and regulating position and velocity vector errors to obtain a low position error drift.

14. The WSN of claim 13 wherein the Kalman filter computes the ZUPD velocity measurement vector $\vec{z}_{SNV-ZV}$ for each stationary interval by the following steps:
1. the Kalman filter computes the relative IMU velocity vector $\vec{v}_{GR-IMU}$ with respect to the stationary ground reference point at each Kalman filter cycle time between times t1 and t2 via the following equation:

$$\vec{v}_{GR-IMU}^n = C_b^n(\vec{\omega}_{IMU}^b \times \vec{l}_{GR-IMU}^b) = -C_b^n(\vec{\omega}_{IMU}^b \times \vec{l}_{IMU-GR}^b)$$

in which $C_b^n$ is a direction cosine matrix (DCM) from the b-frame or IMU body frame to the n-frame or INS navigation frame, and
where $\vec{\omega}_{IMU}^b$ is an angular rate of the IMU corrected for Earth rate, and wherein $$\vec{z}_{SNV-ZV} = \vec{v}_{SNV}^n - \vec{v}_{GR-IMU}^n$$

whereby the Kalman filter uses the ZUPD velocity measurement vector $\vec{z}_{SNV-ZV}$ to estimate and regulate position and velocity errors to be nearly zero and to obtain a low position error drift.

15. The WSN of claim 14 wherein the Kalman filter is characterized to calculate the ZUPD velocity measurement vector $\vec{z}_{SNV-ZV}$ with an iteration rate of at least 10 iterations per second during the stationary interval between the time t1 when the surveyor plants the WSN and the ground switch closes and the time t2 when the surveyor lifts the WSN and the ground switch opens.

16. A walking stick navigator (WSN) on a shaft assembly, a surveyor carrying the shaft assembly and positioning a shaft lower end to be in contact with the ground in front of the surveyor marking the start of
a stationary interval, the surveyor
pivoting the shaft assembly in the direction of his movement, and
raising the shaft assembly interrupting the shaft lower end being in contact with the ground at the conclusion of each step
marking the end of the stationary interval, the WSN comprising:
an AINS having an IMU providing output signals developed from the outputs of a plurality of inertial sensors,
a GPS receiver coupled to a top end of the shaft, the GPS receiver being coupled to provide a first aiding signal to the AINS,
a digital computer running a position measurement aiding program, the digital computer being responsive to the AINS output signals for providing a position increment measurement signal to the AINS during a portion of each step for each respective stationary interval to control position error drift.

17. The WSN of claim 16 comprising:
a switch means coupled to the shaft assembly for providing a stationary interval signal to the AINS characterizing the interval during which the shaft lower end is in contact with the ground.

18. The WSN of claim 16 wherein the position increment measurement signal is a position increment measurement vector $\vec{z}_{SNV-PP}$, and wherein,
the AINS further comprises a Kalman filter designed to be responsive to the position increment measurement vector $\vec{z}_{SNV-PP}$ for each stationary period for estimating and regulating position and velocity vector errors to obtain a low position error drift.

19. The WSN of claim 18 wherein the Kalman filter computes the position increment measurement vector $\vec{z}_{SNV-PP}$ for each stationary interval by the following four steps:

step 1. the Kalman filter computes a first relative IMU position vector $\vec{\rho}_1{}^n$ and a second relative IMU position vector $\vec{\rho}_2{}^n$ at times t1 and t2 as follows:

$$\vec{\rho}_1{}^n = C_b{}^n(t_1) \vec{l}_{IMU-GR}{}^b$$

$$\vec{\rho}_2{}^n = C_b{}^n(t_2) \vec{l}_{IMU-Gr}{}^b$$

in which $C_b{}^n$ is a direction cosine matrix (DCM) from the b-frame or IMU body frame to the n-frame or INS navigation frame, and step 2. the Kalman filter computes a time synchronized relative IMU displacement vector $\Delta \vec{\rho}_{1-2}{}^n$ after time t2 using the following equation:

$$\Delta \vec{\rho}_{1-2}{}^n = \vec{\rho}_2{}^n - \vec{\rho}_1{}^n$$

step 3. the Kalman filter computes an inertial navigation solution displacement vector $\Delta \vec{r}_{SNV1-2}$ for the interval from t1 to t2 as follows:

$$\Delta \vec{r}^n_{SNV1-2} = \int_{t_1}^{t_2} \vec{v}^n_{SNV} \, dt$$

where $\vec{v}_{SNV}{}^n$ is an inertial navigator velocity vector resolved in an INS navigation frame, step 4. the Kalman filter computes the position increment measurement vector $\vec{z}_{SNV-PP}$ by taking the difference between the time synchronized relative IMU displacement vector $\Delta \vec{\rho}_{1-2}{}^n$ and the inertial navigation solution displacement vector $\Delta \vec{r}_{SNV1-2}{}^n$ as:

$$\vec{z}_{SNV-PP} = \Delta \vec{r}_{SNV1-2} - \Delta \vec{\rho}_{1-2}{}^n$$

whereby the Kalman filter uses the position increment measurement vector $\vec{z}_{SNV-PP}$ to estimate and regulate position and velocity errors to be nearly zero and to obtain a low position error drift rate.

* * * * *